(12) United States Patent
Oh

(10) Patent No.: US 12,120,978 B2
(45) Date of Patent: Oct. 22, 2024

(54) WHEEL FOR LAWN MOWER ROBOT AND LAWN MOWER ROBOT INCLUDING THE SAME

(71) Applicant: LG ELECTRONICS INC., Seoul (KR)

(72) Inventor: Sukyoon Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 957 days.

(21) Appl. No.: 17/145,578

(22) Filed: Jan. 11, 2021

(65) Prior Publication Data

US 2021/0251132 A1 Aug. 19, 2021

(30) Foreign Application Priority Data

Feb. 13, 2020 (KR) .................. 10-2020-0017880

(51) Int. Cl.
| | |
|---|---|
| *A01C 7/12* | (2006.01) |
| *A01C 5/06* | (2006.01) |
| *A01D 34/00* | (2006.01) |
| *A01D 42/04* | (2006.01) |
| *B60B 7/04* | (2006.01) |
| *A01D 101/00* | (2006.01) |

(52) U.S. Cl.
CPC .............. *A01C 7/126* (2013.01); *A01C 5/064* (2013.01); *A01D 34/001* (2013.01); *A01D 34/008* (2013.01); *A01D 42/04* (2013.01); *B60B 7/04* (2013.01); *A01D 2101/00* (2013.01)

(58) Field of Classification Search
CPC ...... A01C 7/126; A01C 5/064; A01D 34/001; A01D 34/008; A01D 42/04; A01D 2101/00; B60B 19/06; B60B 19/08
See application file for complete search history.

(56) References Cited

U.S. PATENT DOCUMENTS

| | | | | |
|---|---|---|---|---|
| 1,010,260 | A * | 11/1911 | Hill ..................... | A01D 43/16 172/15 |
| 1,330,367 | A * | 2/1920 | Allen ..................... | A01C 7/16 222/409 |
| 2,980,043 | A * | 4/1961 | John ..................... | A01C 7/046 221/277 |

(Continued)

FOREIGN PATENT DOCUMENTS

| | | | | |
|---|---|---|---|---|
| DE | 102015002531 B3 * | 6/2016 | ............... | A61L 2/18 |
| KR | 10-2012-0078967 | 7/2012 | | |

(Continued)

OTHER PUBLICATIONS https://www.youtube.com/watch?v=Rzlj912RIIQ—"Semoir Super Seeder, Ducatillon", Feb. 10, 2020.

(Continued)

*Primary Examiner* — Jamie L McGowan
(74) *Attorney, Agent, or Firm* — KED & ASSOCIATES, LLP

(57) ABSTRACT

A wheel for a lawn mower robot includes a structure in which grass seeds can be discharged during a rotation of the wheel. Accordingly, grass seeds are shown as the lawn mower robot travels while performing a lawn mowing task. Therefore, a task of mowing the lawn and a task of sowing seeds can be performed in a unified manner. Thus, the lawn can be managed more efficiently.

12 Claims, 18 Drawing Sheets

(56) References Cited

U.S. PATENT DOCUMENTS

| | | | | |
|---|---|---|---|---|
| 4,023,511 | A * | 5/1977 | Newman | A01C 5/045 111/91 |
| 4,589,252 | A * | 5/1986 | Williams | A01D 75/28 56/255 |
| 4,735,038 | A * | 4/1988 | Williams | A01D 34/82 56/255 |
| 4,811,796 | A * | 3/1989 | Allen | B60C 5/004 280/836 |
| 5,359,948 | A * | 11/1994 | Makkink | A01C 7/18 222/367 |
| 5,488,917 | A * | 2/1996 | Santoli | A01C 7/02 111/91 |
| 5,528,891 | A * | 6/1996 | Wzietek | A01D 75/28 301/47 |
| 5,632,342 | A * | 5/1997 | Knoblich | A01C 7/008 111/91 |
| 5,662,172 | A * | 9/1997 | Brown | A01B 45/02 56/16.7 |
| 5,690,179 | A * | 11/1997 | Dickson | A01B 29/045 172/554 |
| 6,684,960 | B1 * | 2/2004 | Ng | A01B 45/026 172/42 |
| 9,144,196 | B2 * | 9/2015 | Francis | A01D 43/16 |
| 11,864,495 | B2 * | 1/2024 | Yoon | A01D 34/56 |
| 2021/0251132 | A1 * | 8/2021 | Oh | B60B 7/08 |

FOREIGN PATENT DOCUMENTS

| | | | |
|---|---|---|---|
| KR | 10-1984926 | 5/2019 | |
| KR | 10-2009225 | 8/2019 | |
| WO | WO-9622685 A1 * | 8/1996 | ........... A01C 23/008 |
| WO | WO-2016118993 A1 * | 8/2016 | ........... B60B 19/06 |
| WO | WO-2016118997 A1 * | 8/2016 | ........... B60B 19/06 |
| WO | WO-2016138985 A1 * | 9/2016 | ............... A61L 2/18 |

OTHER PUBLICATIONS

Korean Office Action dated Jul. 27, 2021 issued in Application No. 10-2020-0017880.

* cited by examiner

WHEEL FOR LAWN MOWER ROBOT AND LAWN MOWER ROBOT INCLUDING THE SAME

CROSS-REFERENCE TO RELATED APPLICATION

Pursuant to 35 U.S.C. § 119(a), this application claims the benefit of the earlier filing date and the right of priority to Korean Patent Application No. 10-2020-0017880, filed on Feb. 13, 2020, the contents of which is incorporated by reference herein in its entirety.

BACKGROUND

1. Technical Field

The present disclosure relates to a wheel for a lawn mower robot and a lawn mower robot including the same, and more specifically to a wheel for a lawn mower robot having a structure capable of sowing seeds, and a lawn mower robot including the same.

2. Description of the Related Art

A lawn mower is a machine that trims a lawn in a yard at home, a playground, and the like.

In recent years, according to a trend of automation of devices, an automatic robot-type lawn mower that is not directly operated by a person has been developed.

As is well known, such an automatic robot-type lawn mower is provided with a blade at a lower portion of a main body thereof for cutting grass using a driving force of a motor, and cuts grass to a predetermined length while moving in a preset pattern.

When some parts of grass in an area where the grass is planted die or a density of the grass in the area where the grass is planted decreases, aesthetics of grass field may be deteriorated. Therefore, for managing grass, it is necessary not only to cut the grass to a predetermined length, but also to continuously sow grass seeds.

However, a task of managing grass to a predetermined length is automatically performed by an automatic robot-type lawn mower, but a task of sowing grass seeds is often performed separately. That is, since the task of managing grass to a predetermined length and the task of sowing grass seeds are performed in a dual manner, time and labor needed in managing grass are increased.

The U.S. Pat. No. 5,488,917 discloses a machine for sowing grass seeds. Specifically, the prior art document discloses a seeding machine using a method in which a groove is dug in a ground and seeds are sprayed into the groove, while the seeding machine is traveling.

However, since the prior art document has only a purpose of sowing seeds, the sowing task by the seeding machine disclosed in the prior art document should be performed separately from a task of mowing the lawn.

That is, the prior art document does not suggest a method for solving the problem of increasing a total time and labor needed in managing grass.

PRIOR ART DOCUMENT

Patent Documents

U.S. Pat. No. 5,488,917 (registered on Feb. 6, 1996)

SUMMARY

An aspect of the present disclosure is to provide a wheel for a lawn mower robot having a structure capable of solving the above-described problem, and a lawn mower robot including the same.

Firstly, an aspect of the present disclosure to provide a wheel for a lawn mower robot having a structure capable of sowing grass seeds while mowing the lawn, and a lawn mower robot including the same.

In addition, an aspect of the present disclosure is to provide a wheel for a lawn mower robot having a structure in which grass seeds are shown while the wheel is rotating, and a lawn mower robot including the same.

In addition, an aspect of the present disclosure is to provide a wheel for a lawn mower robot having a structure capable of suppressing excessive sowing of grass seeds, and a lawn mower robot including the same.

In addition, an aspect of the present disclosure is to provide a wheel for a lawn mower robot having a structure capable of allowing grass seeds to be smoothly moved without being clogged in a passage through which grass seeds are supplied, and a lawn mower robot including the same.

In addition, an aspect of the present disclosure is to provide a wheel for a lawn mower robot having a structure that facilitates maintenance and management of a seed storage portion in which grass seeds are stored, and a lawn mower robot including the same.

Another aspect of the present disclosure is to provide a wheel for a lawn mower robot having a structure in which grass seeds can be smoothly supplied to a seed storage portion where grass seeds are stored, and a lawn mower robot including the same.

In addition, an aspect of the present disclosure to provide a wheel for a lawn mower robot having a structure capable of digging a groove in a ground where grass seeds are to be shown while cutting grass, and a lawn mower robot including the same.

In addition, an aspect of the present disclosure is to provide a wheel for a lawn mower robot having a structure capable of smoothly riding over obstacles on a ground in a process of digging a groove in the ground, and a lawn mower robot including the same.

In order to achieve the above aspects and other advantages according to the present disclosure, there is provided a wheel for a lawn mower robot having the following structure.

Firstly, a wheel for a lawn mower robot includes a seed storage portion for storing seeds and a seed supply portion for transporting seeds from the seed storage portion to an outside of the wheel.

The seed storage portion has a storage space therein. A supply passage, through which one end thereof communicates with the storage space and another end thereof communicates with the outside of the wheel, is formed in the seed supply portion.

The supply passage extends from a circumference of the seed storage portion in a direction away from the seed storage portion, and seeds are discharged to the outside of the wheel through the supply passage from the storage space while the wheel is rotating.

The supply passage may have a bent portion formed at an intermediate portion thereof. Thereby, suppressing an excessive amount of seeds from being conveyed in a short time through the supply passage.

An end portion of the supply passage through which seeds are discharged is provided with an inclined surface inclined in a direction away from the supply passage and a direction toward the outside of the wheel. At the end portion of the supply passage, the seeds can slide on the inclined surface to be smoothly discharged to the outside of the wheel.

The seed storage portion and the seed supply portion may be provided in a wheel cover or a wheel frame.

In addition, a digging member may be provided at a front side of the lawn mower robot.

The digging member includes a digging portion curved in a forward direction of the lawn mower robot or curved in a direction opposite to the forward direction.

In addition, the digging portion curved in the opposite direction is configured to be rotatable in a direction toward or away from the wheel. Accordingly, when encountering stones or obstacles, the digging portion is rotated in a direction toward the wheel so as to easily ride over the stones or obstacles.

A wheel for a lawn mower robot according to an embodiment of the present disclosure includes a wheel frame rotated by a power portion, and a wheel cover detachably coupled to one side of the wheel frame.

In addition, the wheel cover includes a seed storage portion protruding from one surface of the wheel cover toward the wheel frame and having a storage space therein, a seed supply portion extending in a direction away from a circumference of the seed storage portion and having a supply passage formed therein to communicate with the storage space, and a seed outlet port located at an end portion of the supply passage and formed through in a direction away from the wheel frame.

In addition, the seed supply portion is formed in plural along the circumference of the seed storage portion.

In addition, the supply passage includes an inlet passage communicating with the storage space and extending in a direction away from the seed storage portion, an outlet passage spaced apart from the inlet passage by a predetermined distance in a circumferential direction of the seed storage portion, and extending in the direction away from the seed storage portion, and communicating with the seed outlet port, and an intermediate passage connecting the inlet passage and the outlet passage.

In addition, the supply passage includes an inlet passage communicating with the storage space and extending in a direction away from the seed storage portion, an intermediate passage communicating with the inlet passage and extending while forming a predetermined angle with the inlet passage, and an outlet passage communicating with the intermediate passage, extending in the direction away from the seed storage portion, and communicating with the seed outlet port.

In addition, the seed supply portion has an inclined surface located at an end portion of the supply passage and inclined in a direction away from the seed storage portion and in a direction toward the seed outlet port.

In addition, the wheel cover has a first through hole formed therethrough to communicate the storage space and an outside of the wheel cover, and the wheel cover includes a first cover covering the first through hole and detachably coupled to the first through hole.

In addition, the first cover has a second through hole formed therethrough to communicate the storage space and the outside of the wheel cover, the second through hole is located adjacent to a circumference of the first cover, and the wheel cover includes a second cover covering the second through hole and detachably coupled to the second through hole.

In addition, a lawn mower robot accordingly to an embodiment of the present disclosure includes an inner body provided with a power portion therein, a pair of wheels provided at both sides of the inner body and rotated by the power portion, and an outer cover covering the inner body and each side of the pair of wheels.

In addition, the wheel includes a wheel frame rotated by the power portion, and a wheel cover detachably coupled to one side of the wheel frame.

In addition, the wheel cover includes a seed storage portion protruding from one surface of the wheel cover toward the wheel frame and having a storage space therein, a seed supply portion extending in a direction away from a circumference of the seed storage portion and having a supply passage formed therein to communicate with the storage space, and a seed outlet port located at an end portion of the supply passage and formed through in a direction away from the wheel frame.

In addition, the lawn mower robot further includes a digging member coupled to one side of the outer cover.

In addition, the digging member includes a frame portion extending to both sides of the inner body, and a pair of digging portions provided at both sides of the frame portion and extending toward a ground.

In addition, the digging portion is formed to be bent in a direction away from the wheel, and one surface of the digging portion facing the direction away from the wheel has a reinforcing member coupled thereto.

In addition, a distance between two parts spaced farthest apart from each other among parts of each end portion of the pair of digging portions is greater than a distance between two parts spaced farthest apart from each other among parts of the pair of wheels.

In addition, the digging portion is formed to be bent in a direction close to the wheel, and one surface of the digging portion facing forward is provided with a reinforcing member coupled thereto.

In addition, the digging portion is rotatably coupled to the frame portion in a direction toward or away from the wheel by a predetermined angle, and is provided with an elastic member configured to press the digging portion in a direction away from the wheel as the digging portion approaches the wheel.

In addition, the seed supply portion is formed in plural along the circumference of the seed storage portion.

In addition, the supply passage includes an inlet passage communicating with the storage space and extending in a direction away from the seed storage portion, an outlet passage spaced apart from the inlet passage by a predetermined distance in a circumferential direction of the seed storage portion, extending in the direction away from the seed storage portion, and communicating with the seed outlet port, and an intermediate passage connecting the inlet passage and the outlet passage.

In addition, the seed supply portion has an inclined surface located at an end portion of the supply passage and inclined in a direction away from the seed storage portion and in a direction toward the seed outlet port.

In addition, a wheel for a lawn mower robot according to another embodiment of the present disclosure includes a wheel frame rotated by a power portion, and a wheel cover detachably coupled to one side of the wheel frame.

In addition, the wheel frame includes a seed storage portion protruding from one surface of the wheel frame toward the wheel cover and having a storage space therein, a seed supply portion extending in a direction away from a circumference of the seed storage portion and having a supply passage formed therein to communicate with the storage space, and a seed outlet portion extending from one end of the seed supply portion toward the wheel cover, and provided with an outlet passage formed therein to communicate with the supply passage and having one end open.

In addition, the wheel cover has a seed outlet portion insertion hole formed therethrough into which the seed outlet portion is inserted.

In addition, the seed supply portion is formed in plural along the circumference of the seed storage portion.

In addition, the supply passage includes a first passage communicating with the storage space and extending in a direction away from the seed storage portion, a second passage communicating with the first passage and extending while forming a predetermined angle with the first passage, and a third passage communicating with the second passage, extending in the direction away from the seed storage portion, and communicating with the second passage.

In addition, the seed supply portion has an inclined surface located at a portion where the third passage and the outlet passage are connected, and inclined in a direction away from the seed storage portion and in a direction toward the seed outlet portion insertion hole.

According to the present disclosure, the following effects can be achieved.

Firstly, grass seeds are stored in a wheel for a lawn mower robot, and the grass seeds are discharged to an outside of the wheel while the wheel is rotating.

Accordingly, the lawn mower robot can sow seeds and mow the lawn while traveling.

Furthermore, a task of mowing the lawn and a task of sowing seeds are not separately performed, but can be performed simultaneously as the wheel rotates.

Therefore, the task of mowing the lawn and the task of sowing seeds can be performed in a unified manner.

As a result, time and labor are not additionally needed in sowing seeds, thereby reducing time and labor needed in managing the lawn.

In addition, a bent portion may be formed in an intermediate portion of a supply passage for supplying grass seeds to the outside of the wheel. Accordingly, the grass seeds are discharged to the outside of the wheel after hitting the bent portion when moving through the supply passage, thereby suppressing an excessive amount of grass seeds from being discharged in a short time.

Further, an inclined surface is formed at an end portion of the supply passage adjacent to the outside of the wheel. The seeds moved through the supply passage may slide on the inclined surface to be smoothly discharged to the outside of the wheel. Accordingly, grass seeds can be smoothly discharged without being clogged in the supply passage.

In addition, a seed storage portion is provided with a first cover to open and close the seed storage portion. Accordingly, the seed storage portion in which grass seeds are stored can be easily repaired and managed.

In addition, the seed storage portion is provided with a second cover to open and close the seed storage portion. The second cover is formed in a size smaller than the first cover, and is positioned eccentrically with a rotation axis. Thereby, a relatively large amount of grass seeds can be supplied to a storage space at once.

In addition, the lawn mower robot is provided with a digging member digging a groove in a ground, and a portion of the digging member that digs a groove is located outside the wheel. Accordingly, seeds discharged from the wheel can be shown into the groove being dug while the lawn mower robot travels.

In addition, a portion of the digging member for digging a groove is formed to be curved in a forward direction of the lawn mower. Accordingly, the ground is pressed in the forward direction by an end portion of the digging portion, and thereby allowing the groove to be dug more easily.

In addition, a portion of the digging member that digs a groove is formed to be curved in a direction opposite to the forward direction of the lawn mower. When stones or obstacles are located on a path on the ground to be dug, the stones or obstacles are brought into contact with a curved surface of the digging member, so that the digging member can more easily ride over the stones or obstacles.

In addition, a portion of the digging member to dig a groove is configured to rotate in a direction opposite to the forward direction when brought into contact with stones or obstacles. When stones or obstacles are located on a path on the ground to be dug, the curved surface of the digging portion is rotated by being brought into contact with the stones or obstacles, so that the digging member can more easily ride over the stones or obstacles.

DETAILED DESCRIPTION OF THE PREFERRED EMBODIMENT

Hereinafter, a wheel for a lawn mower robot and a lawn mower robot including the same according to an embodiment of the present disclosure will be described in detail with reference to the accompanying drawings.

In the followings, descriptions of several components will be omitted in order to clarify technical features of the present disclosure.

1. Definition of Terms

The term "grass" used in the following description refers to any plant that lives in a specific area and can be mowed or cut by a lawn mower robot 10.

The term "seed" used in the following description refers to a seed of any plant including a seed of grass.

The term "wheel" used in the following description refers to a wheel for a lawn mower robot that transmits a driving force of the lawn mower robot to a ground.

The term "task" used in the following description refers to a series of operations performed by the lawn mower robot 10 to mow and manage lawn or grass in a specific area.

The term "forward" used in the following description refers to an operation in which the lawn mower robot 10 moves in a specific direction to perform a task.

The term "backward" used in the following description refers to an operation in which the lawn mower robot 10 is moved in a direction opposite to the specific direction in which the lawn mower robot 10 is moved to perform a task.

The terms "front", "rear", "left", "right", "upper" and "lower" used hereinafter will be understood with reference to the coordinate systems shown in FIG. 1.

2. Description of a Lawn Mower Robot According to an Embodiment of the Present Disclosure FIG. 1 is a perspective view illustrating an appearance of the lawn mower robot 10 in accordance with an embodiment. FIG. 2 is an exploded perspective view illustrating the lawn mower robot 10 of FIG. 1.

Figure 1:
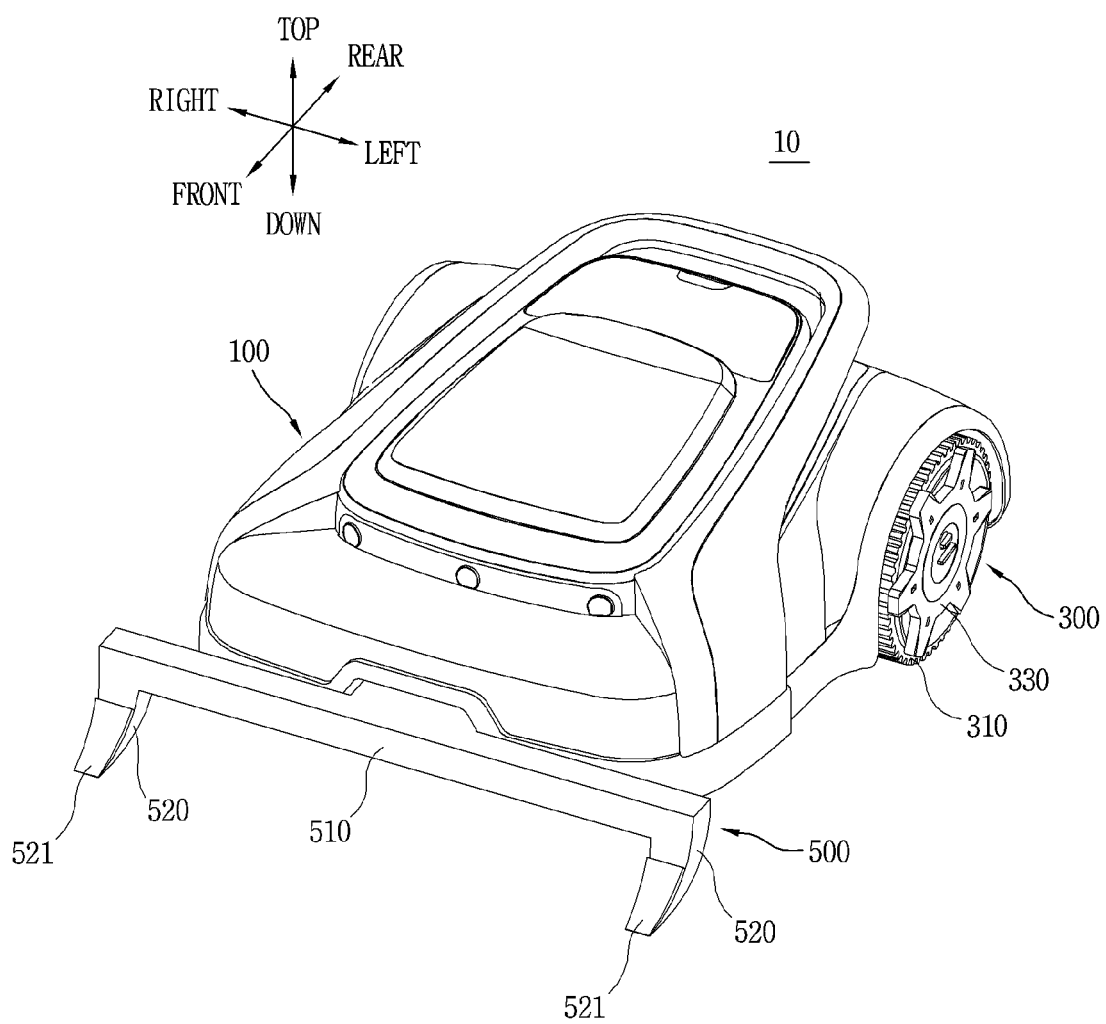
FIG. 1 is a perspective view illustrating an appearance of a lawn mower robot in accordance with an embodiment.
Figure 2:
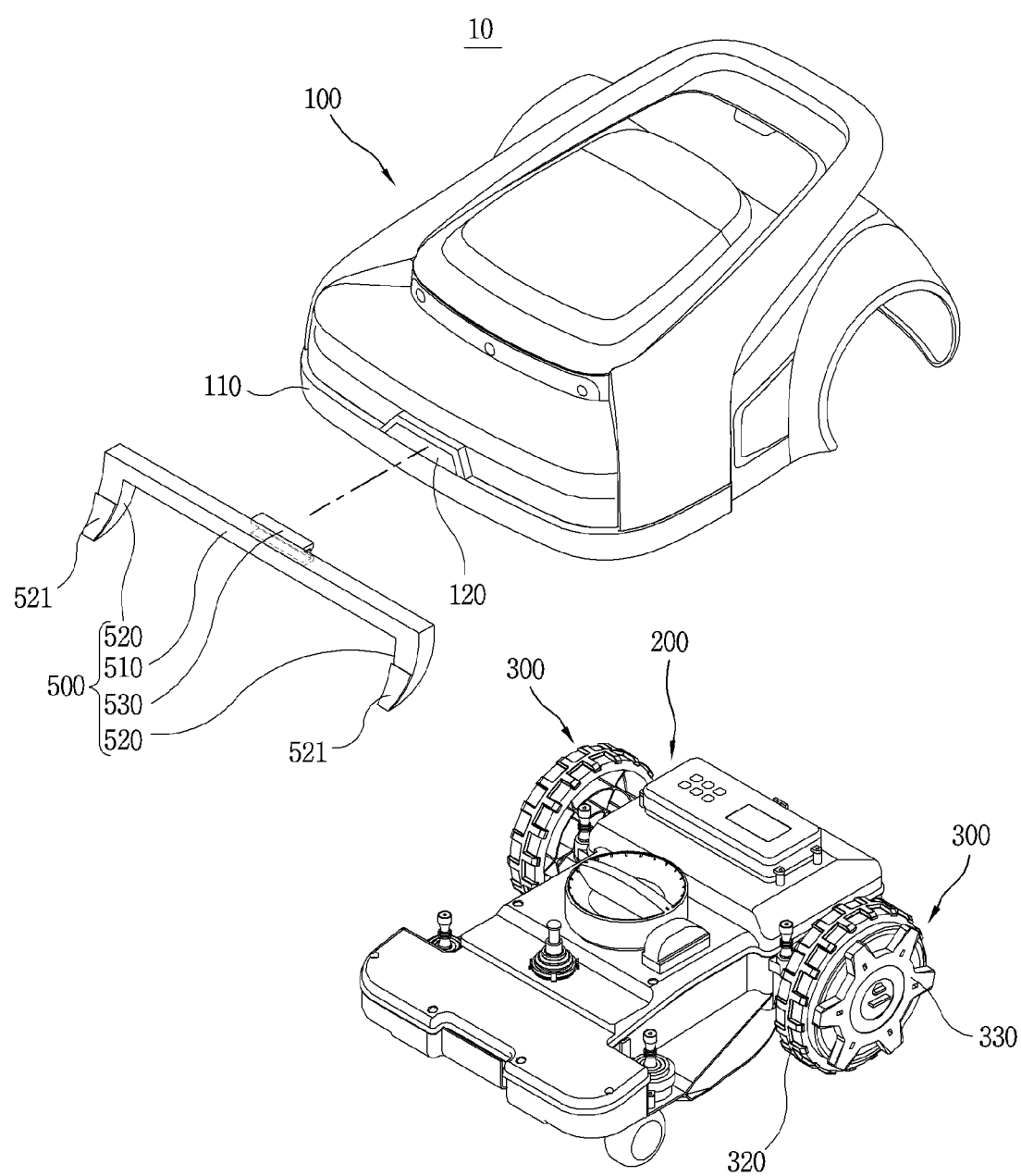
FIG. 2 is an exploded perspective view illustrating a lawn mower robot of FIG. 1.

Referring to FIGS. 1 and 2, the lawn mower robot 10 according to the present disclosure includes an outer cover 100, an inner body 200, a wheel 300, and a digging member 500.

After briefly describing the wheel 300 and the digging member 500, it will be classified into separate paragraphs and described in detail.

(1) Description of the Outer Cover 100

The outer cover 100 is coupled to an upper side of the inner body 200 to be described later to protect the inner body 200 from external factors. In one embodiment, the external factors may be moisture penetration and/or external impact.

The outer cover 100 covers an upper outer surface of the inner body 200, thereby protecting the inner body 200 from the external factors.

It is preferable that the outer cover 100 is made of a material that is lightweight and highly durable. In one embodiment, the outer cover 100 may be made of a synthetic resin such as reinforced plastic.

A front side of the outer cover 100 may be provided with a shock absorbing member 110 that absorbs an impact when the lawn mower robot 10 collides.

The shock absorbing member 110 extends to left and right to be coupled to a front surface of the outer cover 100. Accordingly, the shock absorbing member 110 can absorb shock when a front side of the lawn mower robot 10 collides.

In addition, a left side and a right side of the shock absorbing member 110 are curved in a backward direction to be coupled with parts of a left surface and a right surface of the outer cover 100. Accordingly, the shock absorbing member 110 can absorb shock when the left and right surfaces adjacent to the front side of the lawn mower robot 10 collide.

A mounting hole 110a (see FIG. 14) into which a part of the digging member 500 to be described later is inserted may be formed through a central portion of the shock absorbing member 110.

The mounting hole 110a is covered by a mounting hole opening and closing member 120. The mounting hole opening and closing member 120 is rotatably coupled to the shock absorbing member 110 at a lower side of the mounting hole 110a.

When the digging member 500 is inserted into the mounting hole 110a to be coupled with the shock absorbing member 110, the mounting hole opening and closing member 120 is pressed to a rear side by the digging member 500. Accordingly, the mounting hole opening and closing member 120 is rotated backward to open the mounting hole 110a.

When a coupling of the digging member 500 and the shock absorbing member 110 is released and the digging member 500 is separated from the mounting hole 110a, the mounting hole opening and closing member 120 is rotated in a forward direction so that the mounting hole 110a is closed. In one embodiment not illustrated, the mounting hole opening and closing member 120 may be rotated in a forward direction by a torsion spring (not illustrated).

(2) Description of the Inner Body 200

The inner body 200 forms a body in which various components used to operate the lawn mower robot 10 are accommodated and/or combined. The term "operate" refers to an operation of the lawn mower robot 10 moving forward, backward, changing direction, sensing an external environment, and cutting the lawn.

A cutting portion (not illustrated) for cutting grass is provided at a lower side of the inner body 200. When the lawn mower robot 10 travels, grass can be cut to a predetermined length by the cutting portion (not illustrated). Cutting grass by the cutting portion (not illustrated) provided at the lower side of the lawn mower robot 10 is a well-known technique, and a detailed description thereof will be omitted.

It is preferable that the inner body 200 is made of a material that is lightweight and highly durable. In one embodiment, the inner body 200 may be made of a synthetic resin such as reinforced plastic.

The inner body 200 includes a shaft 210 (see FIG. 3) that transmits rotational force to the wheel 300 to be described later.

The shaft 210 connects a driving motor (not illustrated) provided in the inner body 200 and the wheel 300. When the driving motor rotates, the shaft 210 connected to the driving motor also rotates, and rotational force of the driving motor is applied to the wheel 300 by the shaft 210. Accordingly, the wheel 300 may be rotated clockwise or counterclockwise so that the lawn mower robot 10 is moved forward or backward.

(3) Description of the Wheel 300

The wheel 300 is provided at one end portion of the shaft 210.

The shaft 210 protrudes from a left side and a right side of the inner body 200, respectively. The wheel 300 is coupled to both end portions protruding from the shaft 210, respectively. That is, the wheel 300 is provided in a pair at the left side and the right side of the inner body 200.

A caster wheel (not illustrated) is provided at a front side of the wheel 300. The caster wheel is rotatably coupled to the inner body 200, and a traveling direction of the inner body 200 is determined by a direction in which the caster wheel is rotated.

One surface of the wheel 300 is provided with a seed outlet port 3301 for sowing seeds while traveling. Since seeds are discharged through the seed outlet port 3301 while the wheel 300 rotates, the lawn mowing robot 10 can simultaneously perform tasks of mowing the lawn and sowing grass seeds.

In other words, the lawn mower robot 10 can mow the lawn and sow grass seeds on a traveling path at the same time while traveling.

A structure in which grass seeds in the wheel 300 are discharged will be described in detail later.

(4) Description of the Digging Member 500

The front side of the lawn mower robot 10 is provided with the digging member 500 for digging a groove in which grass seeds are planted.

In one embodiment, the shock absorbing member 110 of the outer cover 100 may be coupled to the digging member 500 for digging a groove where grass seeds are planted.

The digging member 500 includes a frame portion 510 extending by a predetermined length in a direction crossing a traveling direction of the lawn mower robot 10. In the illustrated embodiment, the frame portion 510 extends to left and right by a predetermined length.

In one embodiment, the frame portion 510 may be formed in a shape having a rectangular cross-section. However, the shape is not limited thereto, and the frame portion 510 may have various shapes of cross-sections. For example, the frame portion 510 may have a polygonal cross-section.

Both sides of the frame portion 510 in a direction in which the frame portion 510 extends are provided with digging portions 520 digging grooves in the ground, respectively. In the illustrated embodiment, the digging portions 520 are located at a left side and a right side of the frame portion 510 and extend downwardly.

A cross-sectional area of the digging portion 520 may decrease as it goes downward. In one embodiment, the digging portion 520 may have a sharp end at a lower end portion thereof. Accordingly, a pressure applied to the ground by the lower end portion of the digging portion 520 can be increased.

As a result, a force needed in digging a groove in which seeds are shown may be reduced, so that a groove can be dug in the ground more easily.

Further, since an amount of reaction force applied to the lawn mower robot 10 by the ground can be reduced, an amount of power required for traveling of the lawn mower robot 10 can be reduced.

The digging portion 520 may be formed to be curved forward? or backward of the lawn mowing robot 10. In one embodiment, the digging portion 520 may be curved in a forward direction of the lawn mowing robot 10.

When the lawn mower robot 10 moves forward, the ground is pressed forwardly while the lower end portion of the digging portion 520 is obliquely embedded in the ground, whereby the groove can be more easily dug.

A central portion of the frame portion 510 may be provided with a coupling portion 530 to be coupled to the outer cover 100. The coupling portion 530 extends from a rear surface of the frame portion 510 in the backward direction. In one embodiment, the coupling portion 530 may be provided at a position where a part of the coupling portion 530 faces the mounting hole opening and closing member 120.

In one embodiment, the coupling portion 530 may be a pair of hook-shaped protrusions spaced apart by a predetermined distance in a vertical direction. Specifically, the pair of hook-shaped protrusions is spaced apart by a vertical height in a portion of the shock absorbing member 110 located at a lower side of the mounting hole 110a. Accordingly, the pair of hook-shaped protrusions is fitted into the shock absorbing member 110 with a shock absorbing member coupling portion 110b positioned at a lower side of the mounting hole 110a interposed therebetween.

In addition, each end portion of the pair of hook-shaped protrusions protrudes toward each other. Accordingly, that the pair of hook-shaped protrusions is arbitrarily moved in a back-and-forth direction while being fitted in the shock absorbing member 110 can be suppressed.

It is preferable that the digging member 500 is made of a material having high rigidity while being lightweight. In one embodiment, the digging member 500 may be made of an aluminum material or the like.

However, a reinforcing member 521 may be provided at a portion of the digging portion 520 that directly presses the ground. Accordingly, a durability of the portion in direct contact with the ground can be improved. The reinforcing member 521 may be attached to a front surface of the digging member 520.

Specifically, the reinforcing member 521 surrounds the front surface of the lower end portion of the digging portion 520, whereby the ground can be directly pressed by the reinforcing member 521.

In one embodiment, the reinforcing member 521 may be made of an iron material.

3. Description of the Wheel 300 According to an Embodiment of the Present Disclosure Hereinafter, the wheel 300 according to this embodiment will be described in detail with reference to FIGS. 3 to 8.

Figure 3:
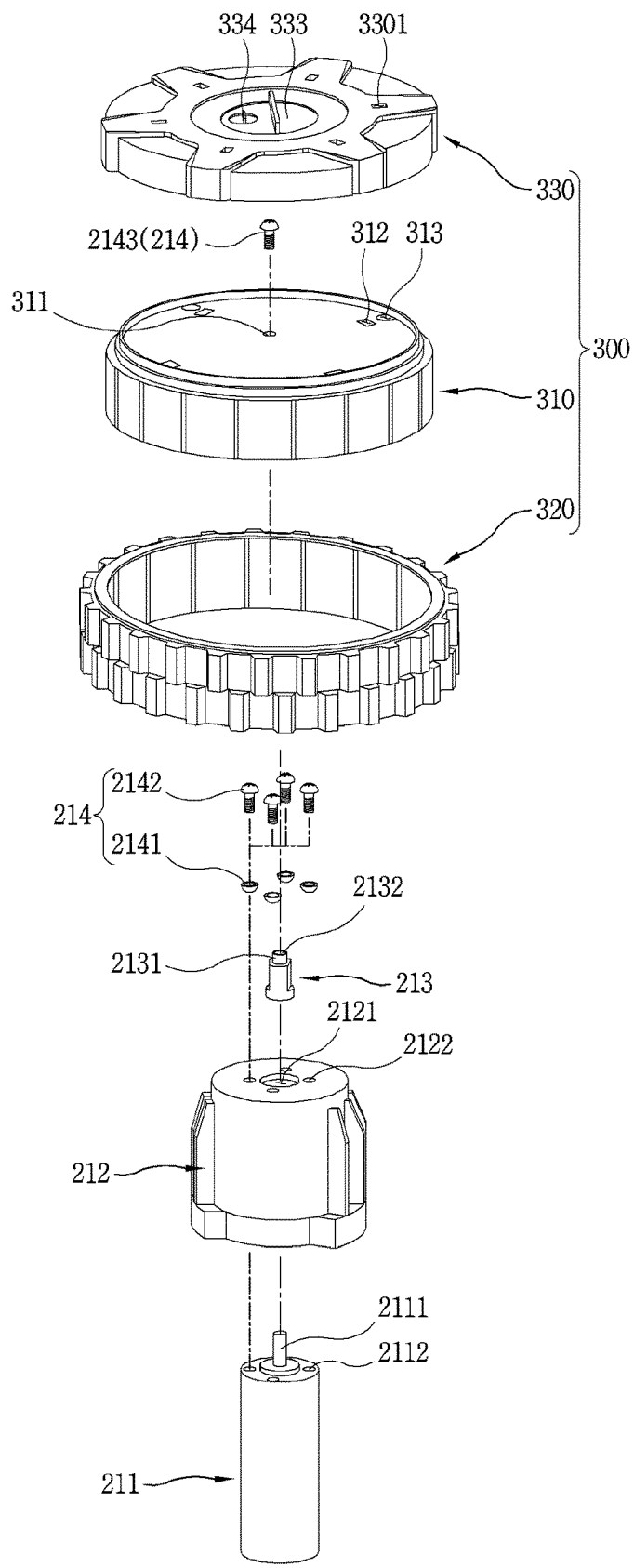
FIG. 3 is an exploded perspective view illustrating a wheel of FIG. 1.
Figure 4:
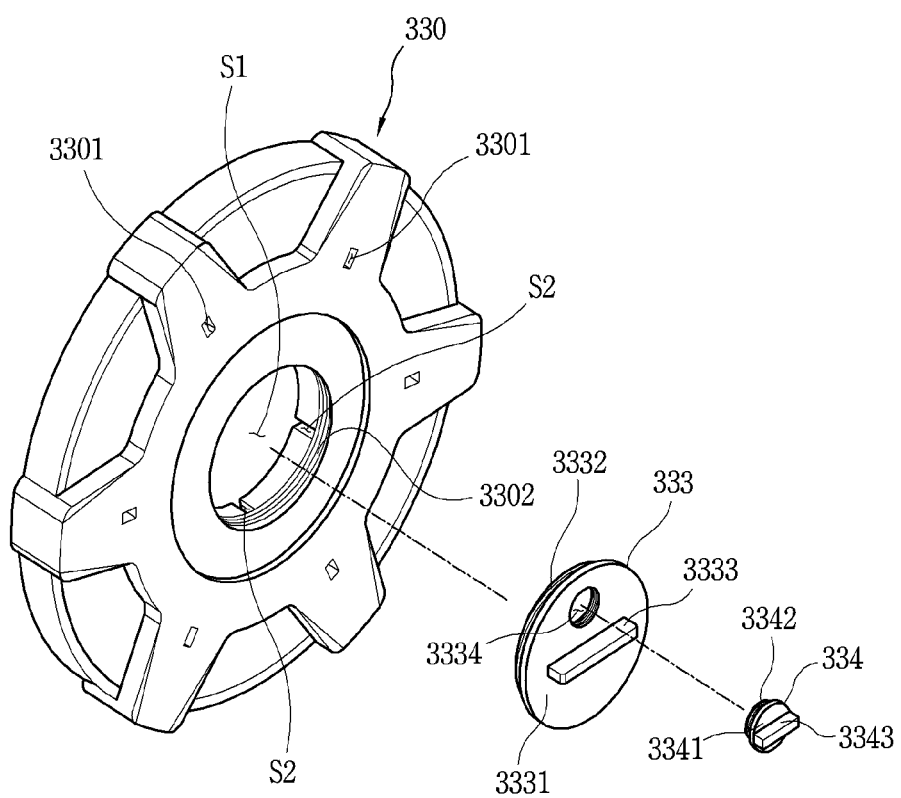
FIG. 4 is an exploded perspective view illustrating a wheel cover of FIG. 3.
Figure 5:
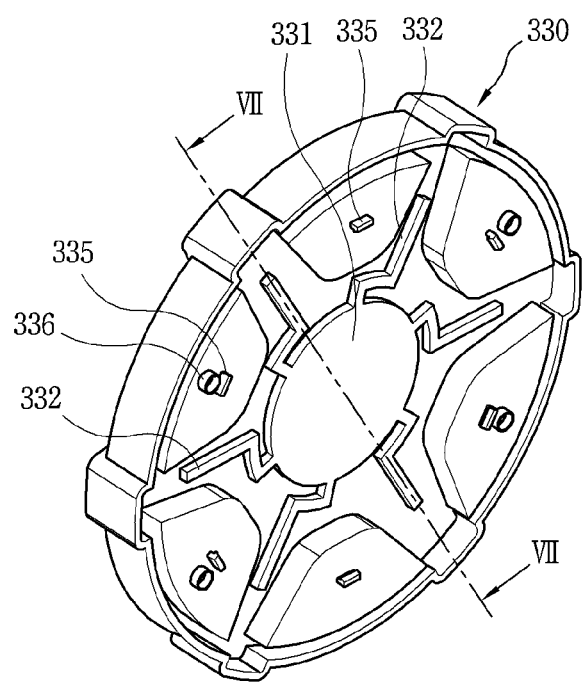
FIG. 5 is a perspective view of a wheel cover of FIG. 3.
Figure 6:
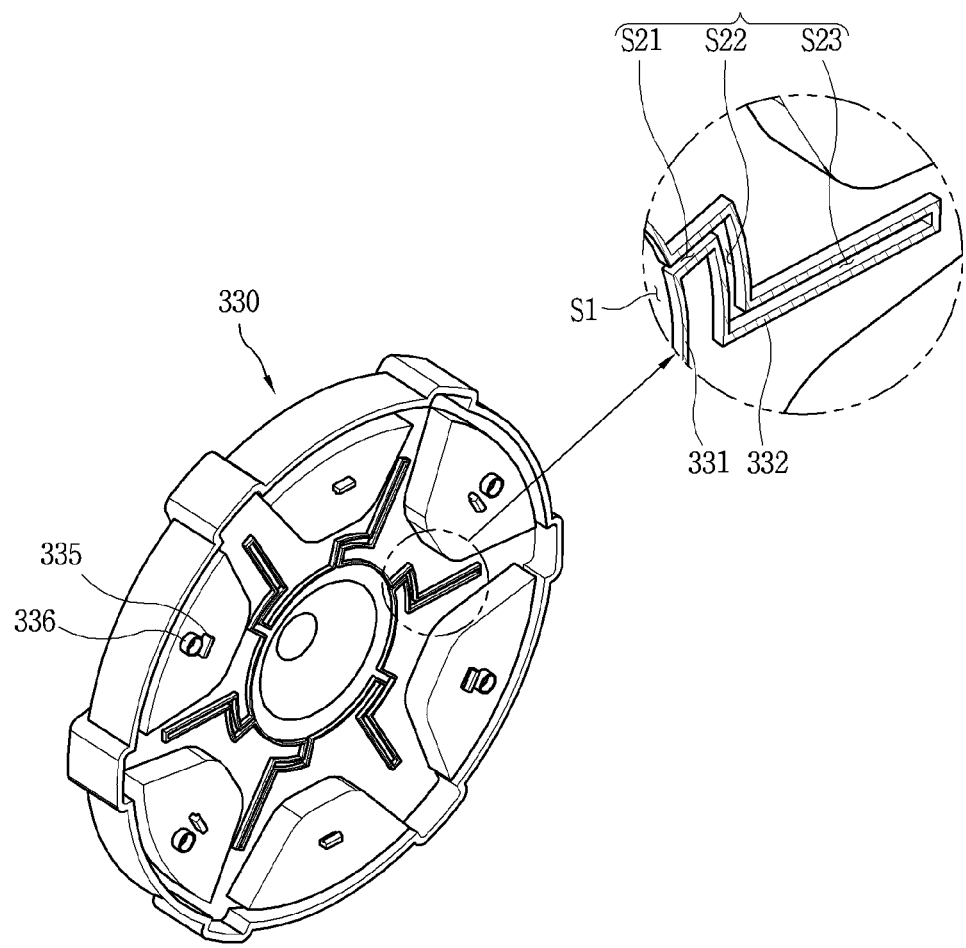
FIG. 6 is a partial cross-sectional view illustrating a seed storage portion and a seed supply portion of FIG. 5.
Figure 7:
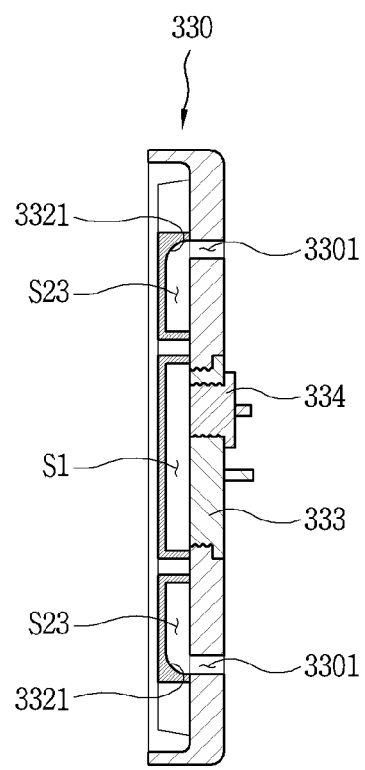
FIG. 7 is a sectional view of the wheel cover of FIG. 5 taken along the line VII-VII.
Figure 8:
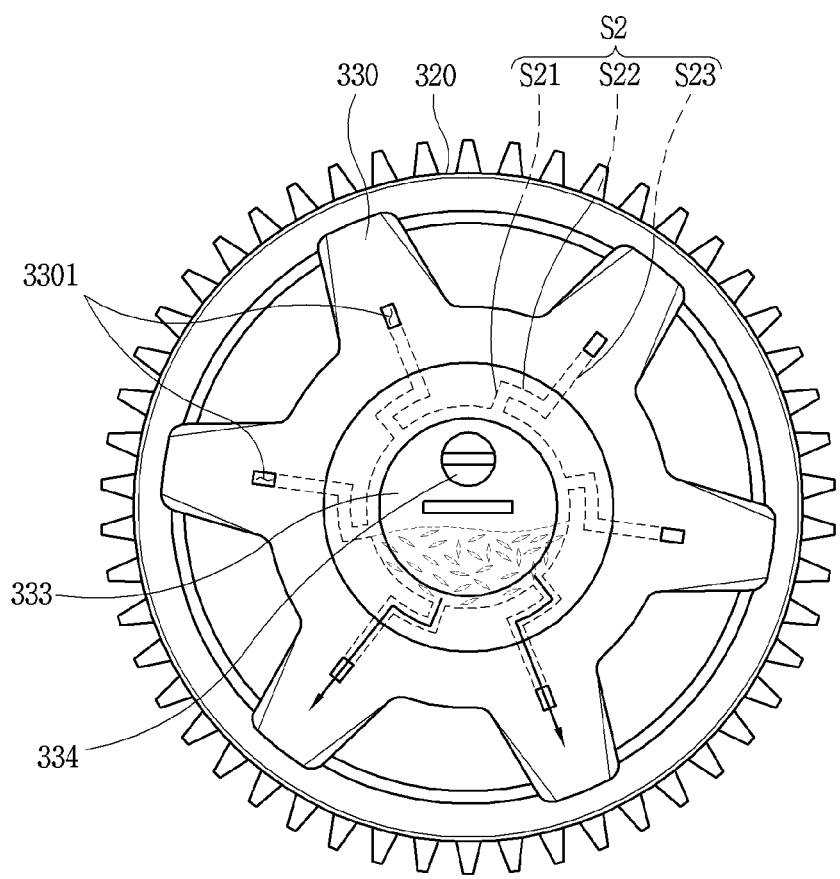
FIG. 8 is a conceptual view illustrating a process of discharging seeds from the lawn mower robot of FIG. 1.

FIG. 3 is an exploded perspective view illustrating the wheel 300 of FIG. 1. FIG. 4 is an exploded perspective view illustrating the wheel cover 330 of FIG. 3. FIG. 5 is a perspective view of the wheel cover 330 of FIG. 3. FIG. 6 is a partial cross-sectional view illustrating a seed storage portion 331 and a seed supply portion 332 of FIG. 5. FIG. 7 is a sectional view of the wheel cover 330 of FIG. 5 taken along the line VII-VII. FIG. 8 is a conceptual view illustrating a process of discharging seeds from the lawn mower robot 10 of FIG. 1.

The wheel 300 according to this embodiment includes a wheel frame 310, a wheel tire 320 and the wheel cover 330. Firstly, a structure in which the wheel 300 is coupled to the shaft 210 will be described, and then each configuration of the wheel 300 will be described in detail.

(1) Description of a Coupling Structure of the Wheel 300 and the Shaft 210

Referring to FIG. 3, a portion of the shaft 210 protruding from the left side or the right side of the inner body 200 is illustrated.

Portions of the shaft 210 protruding from the left side or the right side of the inner body 200 include a shaft portion 211, a motor fixing portion 212, a rotation transmission portion 213, and a coupling portion 214.

The shaft portion 211 has a circular cross section and extends in a direction away from the inner body 200.

In addition, a central portion of an end surface of a shaft portion 211a is provided with a shaft portion coupling protrusion 2111 protruding therefrom. The shaft portion coupling protrusion 2111 passes through the motor fixing portion 212 to be described later so as to be coupled with the rotation transmission portion 213.

In addition, a shaft portion coupling hole 2112 is formed through an end surface of the shaft portion 211. The shaft portion coupling hole 2112 may be formed in plural along a circumference of the shaft portion coupling protrusion 2111.

The motor fixing portion 212 is provided at an end portion of the shaft portion 211.

The motor fixing portion 212 may be formed in a cylindrical shape with one side thereof facing the inner body 200 being opened. A motor fixing portion through hole 2121 is formed through a central portion of another side of the motor fixing portion 212 that is closed, and a motor fixing portion coupling hole 2122 is formed through a portion adjacent to the motor fixing portion through hole 2121. The motor fixing portion coupling hole 2122 may be formed in plural along a circumference of the motor fixing portion through hole 2121.

The shaft portion 211 is inserted into the open side of the motor fixing portion 212, and the shaft portion coupling protrusion 2111 passes through the motor fixing portion through hole 2121.

Then, the shaft portion coupling hole 2112 and the motor fixing portion coupling hole 2122 are aligned so as to communicate in an axial direction.

Here, a first coupling member 2142 passes through the motor fixing portion coupling hole 2122 to be inserted into the shaft portion coupling hole 2112. With such a configuration, the shaft portion 211 and the motor fixing portion 212 are coupled to each other. In one embodiment, the first coupling member 2142 and the shaft portion coupling hole 2112 may be screwed together. In addition, a washer 2141 may be provided between the first coupling member 2142 and the motor fixing portion coupling hole 2122.

The rotation transmission portion 213 is coupled to the shaft portion coupling protrusion 2111 that has passed through the motor fixing portion through hole 2121.

The rotation transmission portion 213 is coupled with the wheel 300 to transmit a rotational force of the shaft portion 211 to the wheel 300.

An outer circumferential surface of the rotation transmission portion 213 in contact with the wheel 300 may be formed in a polygonal shape. In one embodiment, the outer circumferential surface of the rotation transmission portion 213 may be formed in a D-cut shape. Accordingly, the rotation transmission portion 213 and the wheel 300 being idle with each other can be prevented.

The rotation transmission portion 213 is inserted into one side of the wheel frame 310. In a state in which the rotation transmission portion 213 is inserted into the wheel frame 310, a rotation transmission portion coupling protrusion 2131 protrudes from a central portion of an end surface of the rotation transmission portion 213 facing the wheel frame 310. A rotation transmission portion coupling hole 2132 is formed through a central portion of an end surface of the rotation transmission portion coupling protrusion 2131.

The rotation transmission portion coupling protrusion 2131 passes through the shaft coupling hole 311 formed through a central portion of the wheel frame 310, and a second coupling member 2143 is inserted into the rotation transmission portion coupling hole 2132. Accordingly, the rotation transmission portion 213 and the wheel frame 310 are coupled. Furthermore, the shaft 210 and the wheel 300 are coupled to each other. In one embodiment, the second coupling member 2143 and the rotation transmission portion coupling hole 2132 may be screwed together.

(2) Description of the Wheel Frame 310

The wheel 300 includes the wheel frame 310 formed in a circular shape.

The wheel frame 310 may be formed in a cylindrical shape with one side thereof facing the shaft 210 being opened. Accordingly, a weight of the wheel frame 310 may be reduced.

However, when the wheel frame 310 is formed in a cylindrical shape, an overall rigidity of the wheel frame 310 may be reduced. In consideration of this point, ribs (not illustrated) for reinforcing a rigidity may be formed on an inner surface and an outer surface of the wheel frame 310, respectively.

A shaft coupling hole 311 through which a part of the rotation transmission portion 213 is inserted is formed in the central portion of the wheel frame 310. Description of a coupling structure between the shaft coupling hole 311 and the rotation transmission portion 213 is described above, and will not be repeated.

A hook protrusion coupling hole 312 and a fitting protrusion coupling hole 313 are respectively formed through the wheel frame 310 with being spaced apart from a center of the wheel frame 310 by a predetermined distance.

The hook protrusion coupling hole 312 and the fitting protrusion coupling hole 313 may be formed in plural in a circumferential direction with being spaced inwards from an outer circumference of the wheel frame 310.

The hook protrusion coupling hole 312 is detachably coupled to a hook protrusion 3312 to be described later, and the fitting protrusion coupling hole 313 is detachably coupled to a fitting protrusion 3313 to be described later.

(3) Description of the Wheel Tire 320

The wheel tire 320 is detachably coupled to an outer circumferential surface of the wheel frame 310.

The wheel tire 320 may be formed in an annular shape having a diameter that can be fitted to the outer circumferential surface of the wheel frame 310.

Grooves with a predetermined pattern may be recessed on an outer circumferential surface of the wheel tire 320 to improve a grip force of the wheel tire 320.

In one embodiment, the wheel tire 320 may be made of rubber or the like.

(4) Description of the Wheel Cover 330

The wheel cover 330 may be detachably coupled to another side of the wheel frame 310 which is opposite to one side of the wheel frame 310 facing the inner body 200.

Referring to FIGS. 4 to 6, the wheel cover 330 is formed in a circular shape.

An outer circumferential side of the wheel cover 330 is formed to be curved toward the wheel frame 310. Accordingly, when the wheel cover 330 and the wheel frame 310 are coupled, the wheel cover 330 and the wheel frame 310 are spaced apart to form a predetermined space therebetween.

In the predetermined space, a structure capable of sowing grass seeds when the wheel 300 rotates may be formed. In the predetermined space, the seed storage portion 331 for storing grass seeds and the seed supply portion 332 for supplying grass seeds from the seed storage portion 331 to an outside of the wheel 300 may be formed.

In one embodiment, the seed storage portion 331 and the seed supply portion 332 are formed to protrude from one surface of the wheel cover 330 facing the wheel frame 310.

The seed storage portion 331 is located at a central portion of the wheel cover 330, and a storage space S1 in which grass seeds can be stored is formed in the seed storage portion 331.

In one embodiment, the seed storage portion 331 may be formed in a cylindrical shape with the storage space S1 formed therein. However, the shape is not limited thereto, and the seed storage portion 331 may be formed in a polygonal column shape having the storage space S1 therein.

The storage space S1 may be formed in a shape corresponding to an outer surface of the seed storage portion 331. For example, the seed storage portion 331 may be formed in a cylindrical shape, and a cylindrical storage space S1 may be formed inside the seed storage portion 331.

However, the shape is not limited thereto, and the cylindrical storage space S1 may be formed inside the seed storage portion 331 in a polygonal column shape.

It is preferable that the storage space S1 is formed to be symmetrical with respect to a rotation axis about which the wheel 300 is rotated. Then, when the wheel 300 rotates, an amount of grass seeds moved to an inner surface of the storage space S1 adjacent to the ground may be relatively uniform. Accordingly, when the wheel 300 rotates, an amount of shown grass seeds may be relatively uniform.

The seed supply portion 332 is formed around the seed storage portion 331 to transfer seeds from the storage space S1 to the outside of the wheel 300.

The seed supply portion 332 extends in a direction away from a circumference of the seed storage portion 331, and a supply passage S2 communicating with the storage space S1 is formed in the seed supply portion 332.

The seed supply portion 332 may be formed in plural along the circumference of the seed storage portion 331.

In one embodiment, a plurality of seed supply portions 332 may be formed to be spaced apart from each other by a predetermined distance.

In one embodiment, the plurality of seed supply portions 332 may be formed to be spaced apart from each other at approximately uniform intervals.

In one embodiment, the plurality of seed supply portions 332 may be formed to be spaced apart from each other at uniform intervals.

Accordingly, when the wheel 300 rotates, grass seeds can be shown at relatively uniform intervals in a traveling path of the lawn mower robot 10.

The supply passage S2 may include an inlet passage (or a first passage) S21, an intermediate passage (or a second passage) S22, and an outlet passage (or a third passage) S23.

The inlet passage S21 is a passage directly communicating with the storage space S1, and the outlet passage S23 is a passage directly communicating with the seed outlet port 3301 for discharging seeds to the outside of the wheel 300, and the intermediate passage S22 is a passage connecting the inlet passage S21 and the outlet passage S23.

When the wheel 300 rotates, seeds stored in the storage space S1 are introduced into the supply passage S2 adjacent to the ground by gravity to be discharged through the seed outlet port 3301.

The inlet passage S21 communicates with the storage space S1 and extends in a direction away from the seed storage portion 331.

That is, the inlet passage S21 communicates with the storage space S1, and extends radially outward from the seed storage portion 331.

The outlet passage S23 is spaced apart from the inlet passage S21 by a predetermined distance in a circumferential direction of the seed storage portion 331 and extends in a direction away from the seed storage portion 331.

That is, the outlet passage S23 is spaced apart from the inlet passage S21 by a predetermined distance in a clockwise or counterclockwise direction with respect to a center of the seed storage portion 331, and extends radially outward from the seed storage portion 331.

The inlet passage S21 and the outlet passage S23 spaced apart from each other are connected by the intermediate passage S22.

That is, the inlet passage S21 and the intermediate passage S22 have a predetermined angle with each other, and the intermediate passage S22 and the outlet passage S23 have a predetermined angle with each other. Accordingly, in a process of discharging seeds through the supply passage S2, the seeds hit an inner wall at a part where the inlet passage S21 and the intermediate passage S22 are connected and hit an inner wall at a part where the intermediate passage S22 and the outlet passage S23 are connected.

As a result, a speed at which the seeds pass through the supply passage S2 may be reduced. Accordingly, excessive supply of seeds can be suppressed. That is, a supply amount of seeds can be adjusted so that seeds are not excessively shown.

In the illustrated embodiment, a predetermined angle formed by the inlet passage S21, the intermediate passage S22, and the outlet passage S23 may be a right angle.

However, the angle is not limited thereto, and may be formed at various angles to control the supply amount of seeds.

For example, the inlet passage S21 and the outlet passage S23 may be disposed to partially overlap each other in the circumferential direction of the seed storage portion 331 so that a predetermined angle is formed to be an acute angle. Accordingly, a speed at which the seeds pass through the supply passage S2 may be reduced compared to the case of being formed in the right angle.

For example, the inlet passage S21 and the outlet passage S23 may be disposed in a manner of not overlapping each other in the circumferential direction of the seed storage portion 331 so that a predetermined angle is formed to be an obtuse angle. Accordingly, a speed at which the seeds pass through the supply passage S2 may be increased compared to the case of being formed in the right angle.

Seeds stored in the storage space S1 pass through the supply passage S2 and the seed outlet port 3301 to be discharged outside the wheel 300. Accordingly, seeds can be shown in the traveling path of the lawn mower robot 10.

A cross-sectional area of the supply passage S2 may be formed to have a size in which seeds can be smoothly transferred without being caught. In the illustrated embodiment, the supply passage S2 may be formed to have a rectangular cross section.

The seed supply portion 332 including the inlet passage S21, the intermediate passage S22, and the outlet passage S23 may be formed in a shape corresponding to each of the passages.

In one embodiment, the seed supply portion 332 extends in a direction away from the circumference of the seed storage portion 331, is bent to extend by a predetermined distance in a clockwise or counterclockwise direction with respect to the center of the seed storage portion 331, and bent to extend radially outward from the seed storage portion 331 by a predetermined distance.

However, the shape is not limited thereto, and the seed supply portion 332 may be formed in various shapes in which the aforementioned supply passage S2 can be formed therein.

Referring to FIG. 7, a portion of the wheel cover 330 that overlaps the storage space S1 in the axial direction may have a first cover coupling hole 3302 formed through. That is, the first cover coupling hole 3302 may be formed through the central portion of the wheel cover 330. Accordingly, the storage space S1 and an outside of the wheel cover 330 communicate with each other by the first cover coupling hole 3302.

The first cover 333 may be detachably coupled to the first cover coupling hole 3302. Accordingly, the storage space S1 may communicate with the outside of the wheel cover 330 or may be partitioned.

The first cover 333 includes a first cover body portion 3331 covering the first cover coupling hole 3302 and a first cover coupling portion 3332 coupled to the first cover coupling hole 3302.

In one embodiment, the first cover body portion 3331 may have a diameter larger than that of the first cover coupling hole 3302. Accordingly, of an outer surface of the wheel cover 330, circumferential portions of the first cover coupling hole 3302 and the first cover body portion 3331 each has a contact surface that contacts each other. Each of the contact surfaces is pressed against each other when combined, and thus foreign substances such as moisture can be prevented from being introduced into the first cover coupling hole 3302.

The first cover coupling portion 3332 extends in the axial direction from the first cover body portion 3331 toward the storage space S1. A diameter of the first cover coupling portion 3332 and an inner diameter of the first cover coupling hole 3302 may be formed substantially the same. In one embodiment, the first cover coupling portion 3332 and the first cover coupling hole 3302 may be screwed together.

A first gripping protrusion 3333 to rotate the first cover 333 protrudes from the first cover 333. The first gripping protrusion 3333 is formed to protrude from an outer surface of the first cover body 3331 toward the outside.

In the illustrated embodiment, the first gripping protrusion 3333 is formed to have a relatively thin protruding height and thickness, and a relatively long extended length. That is, the first gripping protrusion 3333 is formed in a shape of a square column having a length longer than the height and thickness thereof.

However, the shape is not limited thereto, and various shapes in which a user can easily apply force to rotate the first cover 333 can be used.

In one embodiment, in a direction crossing the axial direction, a cross-sectional area of the first cover coupling hole 3302 may be equal to or smaller than a cross-sectional area of the storage space S1. Accordingly, when a problem such as a seed being caught in the storage space S1 or the supply passage S2 occurs, the first cover 333 can be opened to secure a space for repair.

That is, a maintenance of the storage space S1 and the supply passage S2 can be facilitated.

A second cover coupling hole 3334 to inlet grass seeds in the storage space S1 may be formed through the first cover 333.

A second cover 334 may be detachably coupled to the second cover coupling hole 3334. Accordingly, the storage space S1 may communicate with the outside of the wheel cover 330 or be partitioned without having to open the first cover 333.

The second cover 334 includes a second cover body portion 3341 covering the second cover coupling hole 3334 and a second cover coupling portion 3342 coupled to the second cover coupling hole 3334. In addition, a second gripping protrusion 3342 to rotate the second cover 334 protrudes from the second cover 334.

A structure of the second cover 334 and a coupling structure of the second cover 334 and the second cover coupling hole 3334 are similar to a structure of the first cover 333 and a coupling structure of the first cover 333 and the first cover coupling hole 3302, and a detailed description thereof will be omitted.

However, unlike the first cover 333, the second cover 334 is located apart from a center of the first cover 333 by a predetermined distance rather than being located at the center of the first cover 333.

That is, the second cover 334 is located adjacent to an outer circumference of the first cover 333 that is spaced inwards from the outer circumference of the first cover 333. Accordingly, a position of the second cover 334 changes as the wheel 300 rotates.

The second cover 334 may be opened at a point where the second cover 334 is positioned farthest from the ground so as to put seeds in the storage space S1. Here, a large amount of seeds can be put into the storage space S1 compared to a case where the second cover 334 is positioned at the center or near the ground.

As a result, a size of an area in which the lawn mower robot 10 can sow grass seeds with an amount of grass seeds inlet at once can be increased.

Referring to FIG. 7, in the seed supply portion 332, an inclined surface 3321 is formed to change a direction of seeds moved by gravity or by centrifugal force toward the seed outlet port 3301.

The inclined surface 3321 is located at an end portion of the supply passage S2 and located at a portion adjacent to the seed outlet port 3301 of the supply passage S2. Specifically, the inclined surface 3321 is located at an end portion of the outlet passage S23.

In addition, the inclined surface 3321 is formed to be inclined in a direction away from the seed storage portion 331 and in a direction toward the seed outlet port 3301.

Then, seeds in the outlet passage S23 transferred to the inclined surface 3321 by gravity or by centrifugal force moves in a direction toward the seed outlet port 3301 while sliding on the inclined surface 3321.

Accordingly, the seeds can be discharged out of the seed outlet port 3301 without being stacked at a part of the outlet passage S23 adjacent to the seed outlet port 3301.

As a result, seeds can be smoothly discharged from the seed outlet port 3301.

A hook protrusion 335 and a fitting protrusion 336 for coupling the wheel cover 330 protrude from one surface of the wheel cover 330 facing the wheel frame 310.

A shape of an end portion of the hook protrusion 335 and a shape of a connection portion between the end portion of the hook protrusion 335 and one surface the wheel cover 330 are different from each other.

Specifically, a portion of the end portion of the hook protrusion 335 adjacent to the connection portion is formed thicker than the connection portion. Thereby, when the hook protrusion 335 is inserted into the hook protrusion coupling hole 312, the hook protrusion 335 is prevented from being separated from the hook protrusion coupling hole 312 or arbitrarily moving in the axial direction.

In addition, the end portion of the hook protrusion 335 may have an inclined surface inclined in an inserting direction of the hook protrusion 335. Accordingly, the hook protrusion 335 can be smoothly inserted into the hook protrusion coupling hole 312.

The fitting protrusion 336 may be formed in a cylindrical shape. In addition, a diameter of the fitting protrusion 336 may be formed substantially the same as an inner diameter of the fitting protrusion coupling hole 313. Accordingly, a coupling force between the fitting protrusion 336 and the fitting protrusion coupling hole 313 can be increased when the fitting protrusion 336 is inserted into the fitting protrusion coupling hole 313.

The hook protrusion 335 and the fitting protrusion 336 may be formed at positions corresponding to the hook protrusion coupling hole 312 and the fitting protrusion coupling hole 313, respectively. Accordingly, the hook protrusion 335 and the fitting protrusion 336 may be inserted into the hook protrusion coupling hole 312 and the fitting protrusion coupling hole 313, respectively. As a result, the wheel frame 310 and the wheel cover 330 may be coupled to each other.

The hook protrusion 335 and the fitting protrusion 336 may be formed in plural in a circumferential direction with being spaced inwards from an outer circumference of the wheel frame 330.

Referring to FIG. 8, seeds are shown while the wheel 300 is rotating.

In order to show a process of sowing seeds, the storage space S1 and the supply passage S2 are illustrated in dotted lines in FIG. 8.

As the wheel 300 rotates in either a clockwise or counterclockwise direction, a plurality of supply passages S2 also rotates, and the plurality of supply passages S2 is repeatedly positioned adjacent to or away from the ground.

Since the seeds stored in the storage space S1 are pulled toward the ground by gravity, the seeds are transferred from the storage space S1 to the supply passage S2 positioned adjacent to the ground.

The seeds transferred to the supply passage S2 pass through the inlet passage S21, the intermediate passage S22, and the outlet passage S23, then are discharged to the outside of the wheel 300 through the seed outlet port 3301.

Accordingly, the seeds can be discharged to the outside of the wheel 300 as the wheel 300 rotates. That is, the seeds can be discharged to the outside of the wheel 300 during a traveling process of the lawn mower robot 10.

The lawn mower robot 10 equipped with the wheel 300 according to this embodiment can simultaneously perform two tasks for managing the lawn during the traveling process.

Firstly, in the traveling process of the lawn mower robot 10, grass can be cut to a predetermined length by the cutting portion (not illustrated) provided at the lower side of the inner body 200.

In addition, in the traveling process of the lawn mower robot 10, seeds can be discharged outside the wheel 300 to be shown into the groove dug by the digging member 500.

That is, a task of mowing the lawn and a task of sowing seeds are not separately performed, but can be performed simultaneously as the wheel 300 rotates.

That is, the task of mowing the lawn and the task of sowing seeds can be performed in a unified manner.

Therefore, time and labor are not additionally needed in sowing seeds when the task of mowing the lawn and the task of sowing seeds are performed at the same time, whereby reducing time and labor needed in managing the lawn.

That is, managing of the lawn can be performed more efficiently.

In this embodiment, the seed storage portion 331 and the seed supply portion 332 for sowing seeds are formed in the wheel cover 330, but the structure is not limited thereto and may vary according to a shape of the wheel. For example, the seed storage portion and the seed supply portion may be formed in the wheel frame rather than in the wheel cover.

Figure 9:
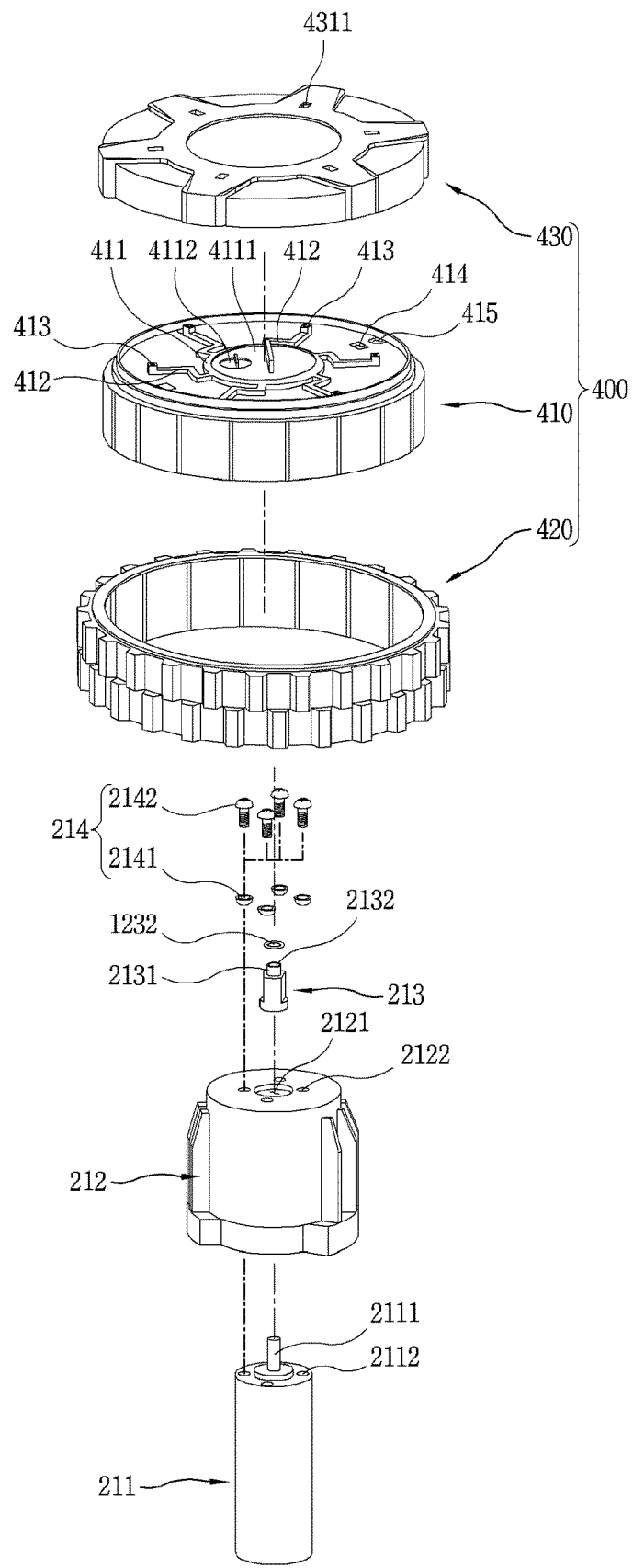
FIG. 9 is an exploded perspective view illustrating a modified embodiment of the wheel of FIG. 1.
Figure 10:
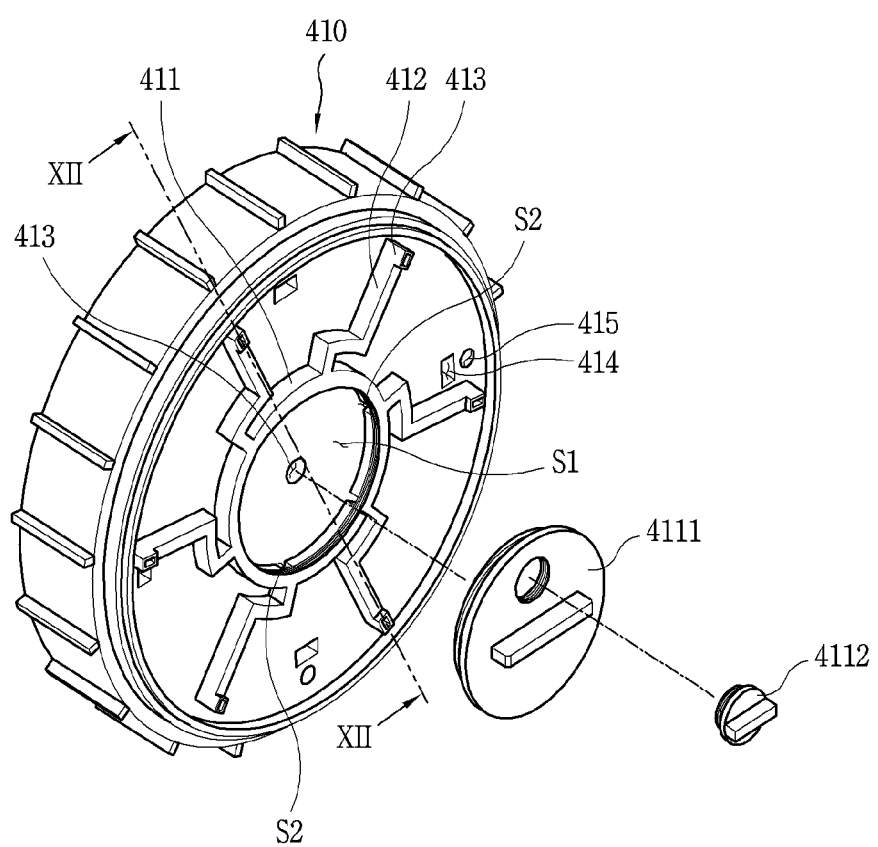
FIG. 10 is an exploded perspective view illustrating a wheel frame of FIG. 9.
Figure 11:
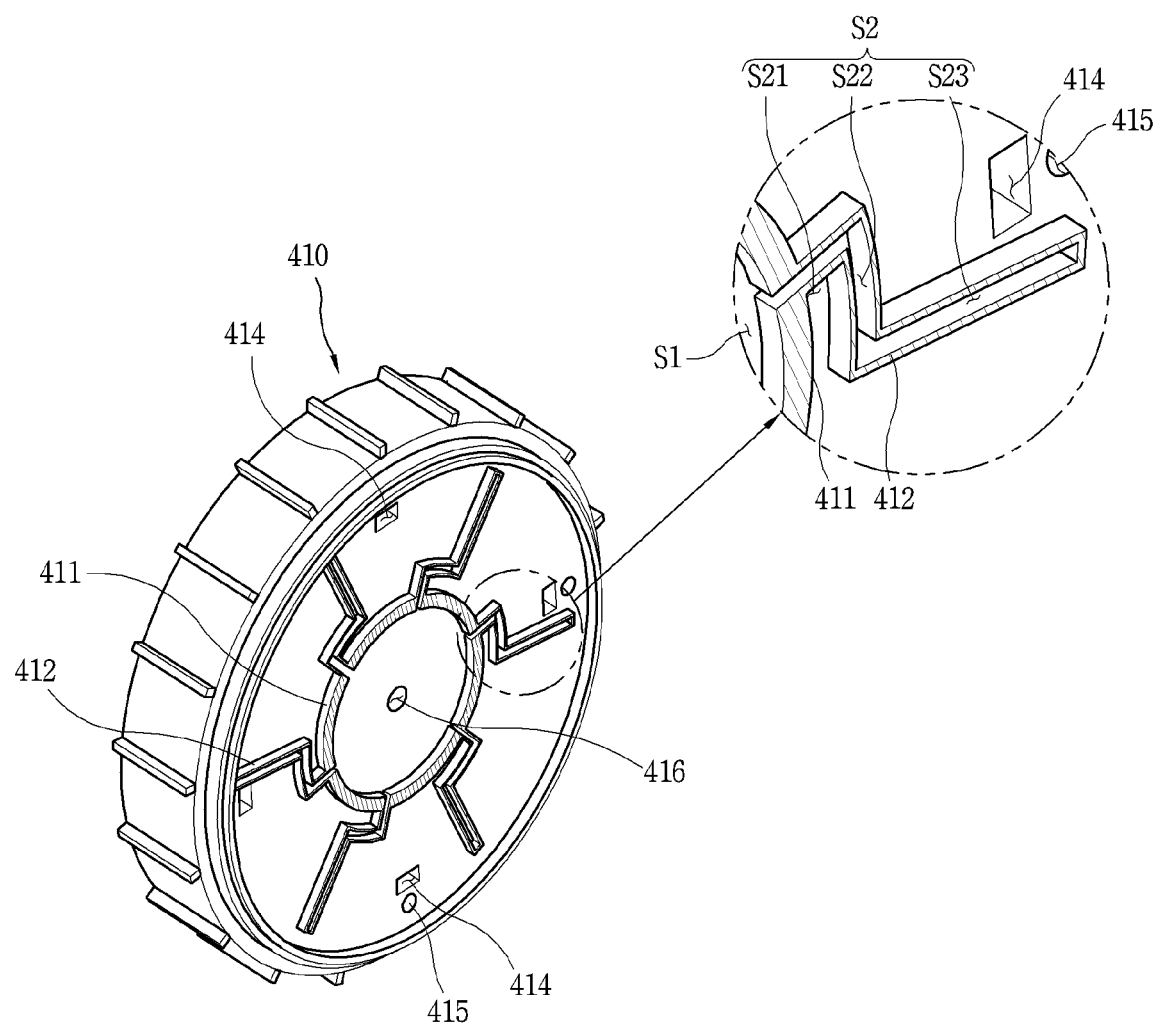
FIG. 11 is a partial cross-sectional view illustrating a seed storage portion and a seed supply portion of FIG. 10.
Figure 12:
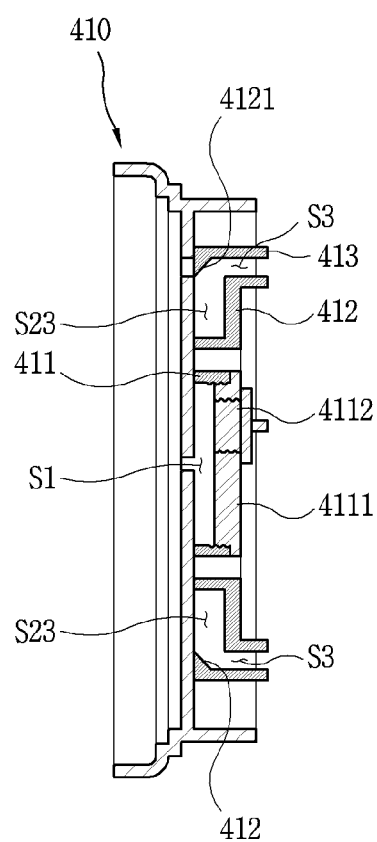
FIG. 12 is a sectional view of the wheel frame of FIG. 10 taken along the line XII-XII.
Figure 13:
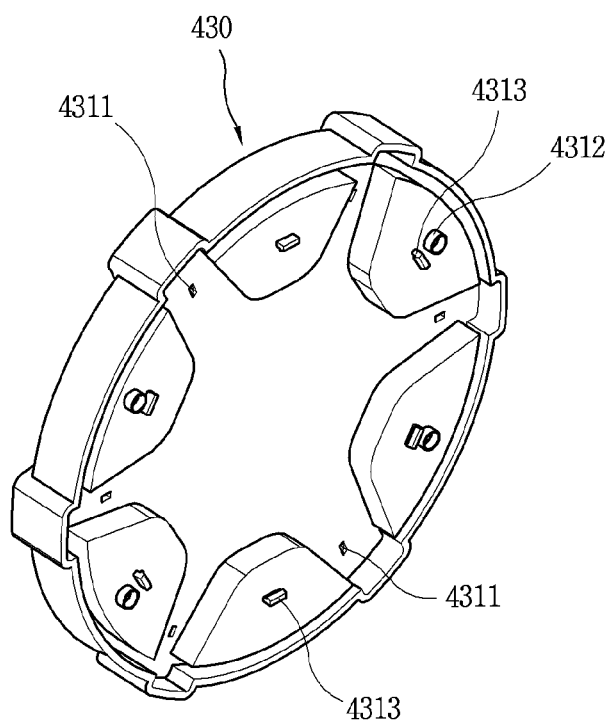
FIG. 13 is a perspective view of a wheel cover of FIG. 9.

4. Description of a Wheel 400 According to Another Embodiment of the Present Disclosure FIG. 9 is an exploded perspective view illustrating a modified embodiment of the wheel of FIG. 1. FIG. 10 is an exploded perspective view illustrating a wheel frame 410 of FIG. 9. FIG. 11 is a partial cross-sectional view illustrating a seed storage portion 411 and a seed supply portion 412 of FIG. 10. FIG. 12 is a sectional view of the wheel frame 410 of FIG. 10 taken along the line XII-XII. FIG. 13 is a perspective view of a wheel cover 430 of FIG. 9.

Referring to FIGS. 9 to 13, the wheel frame 410 provided with the seed storage portion 411 and the seed supply portion 412 is illustrated.

Compared with the wheel 300 according to the above-described embodiment, the wheel 400 according to this embodiment includes the seed storage portion 411 and the seed supply portion 412 formed in the wheel frame 410 rather than in the wheel cover 430.

The seed storage portion 411 and the seed supply portion 412 are formed to protrude from one surface of the wheel frame 410 facing the wheel cover 430.

A first cover 4111 and a second cover 4112 are formed on one surface of the seed storage portion 411 facing the wheel cover 430. Since structures and functions of the first cover 4111 and the second cover 4112 are similar to those of the first cover 333 and the second cover 334 according to the above-described embodiment, a description thereof will not be repeated.

Since structures and functions of the seed storage portion 411 and the seed supply portion 412 are the same as those of the seed storage portion 331 and the seed supply portion 332 according to the above-described embodiment, a description thereof will not be repeated.

An end portion of the seed supply portion 412 is provided with a seed outlet portion 413 extending toward the wheel cover 430 so as to be inserted into a seed outlet portion insertion hole 4311 of the wheel cover 430 when combined.

A seed outlet passage S3 communicating with the outlet passage S23 is formed in the seed outlet portion 413.

One end of the seed outlet passage S3 is connected to the outlet passage S23 and another end of the seed outlet passage S3 is opened. When the seed outlet portion 413 is inserted into the seed outlet portion insertion hole 4311 by being coupled with the wheel cover 430, the another end is opened toward an outside of the wheel 400.

Accordingly, when the wheel 400 rotates, seeds in the storage space S1 are discharged outside the wheel 400 through the inlet passage S21, the intermediate passage S22, the outlet passage S23, and the seed outlet passage S3. The discharged seeds are shown in the groove dug by the digging member 500.

Figure 14:
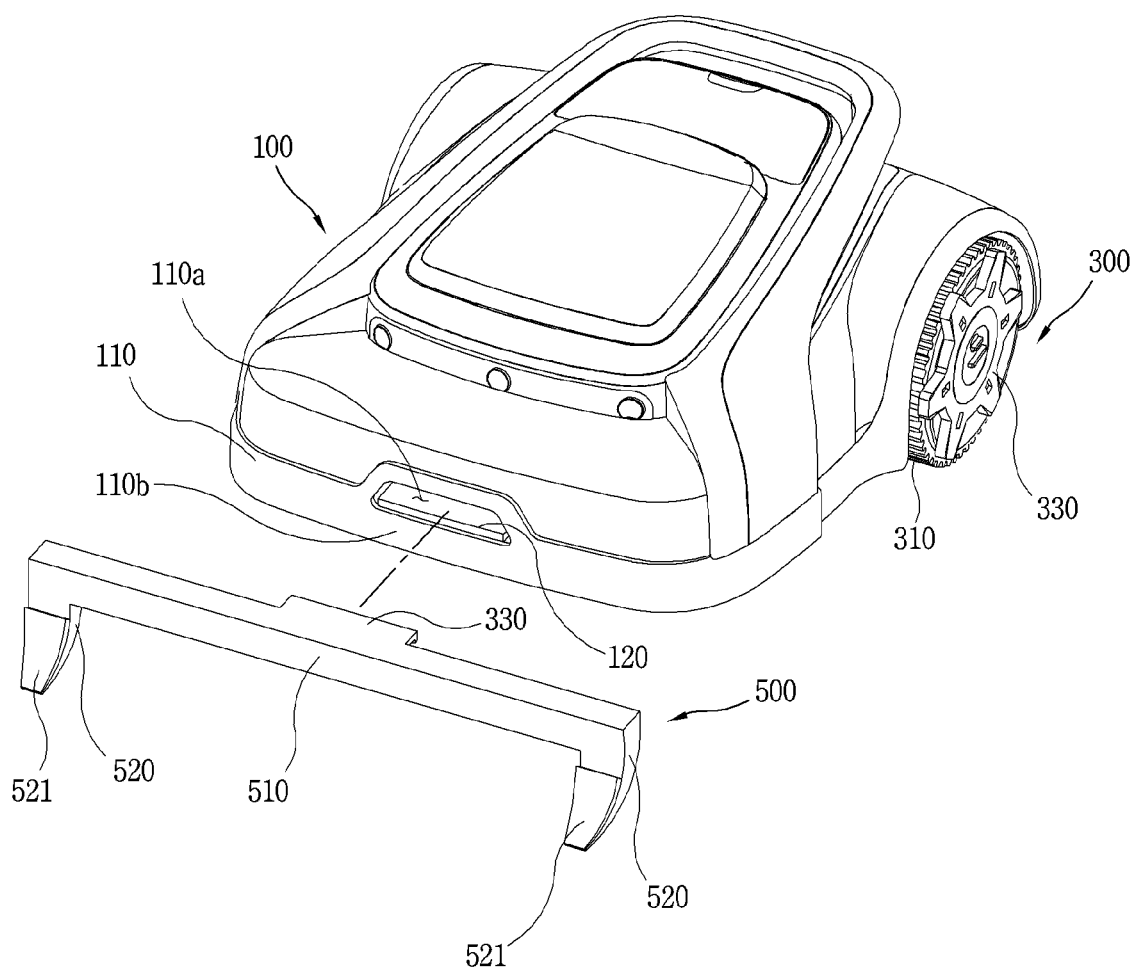
FIG. 14 is an exploded perspective view illustrating a lawn mower robot in accordance with an embodiment of the present disclosure.
Figure 15:
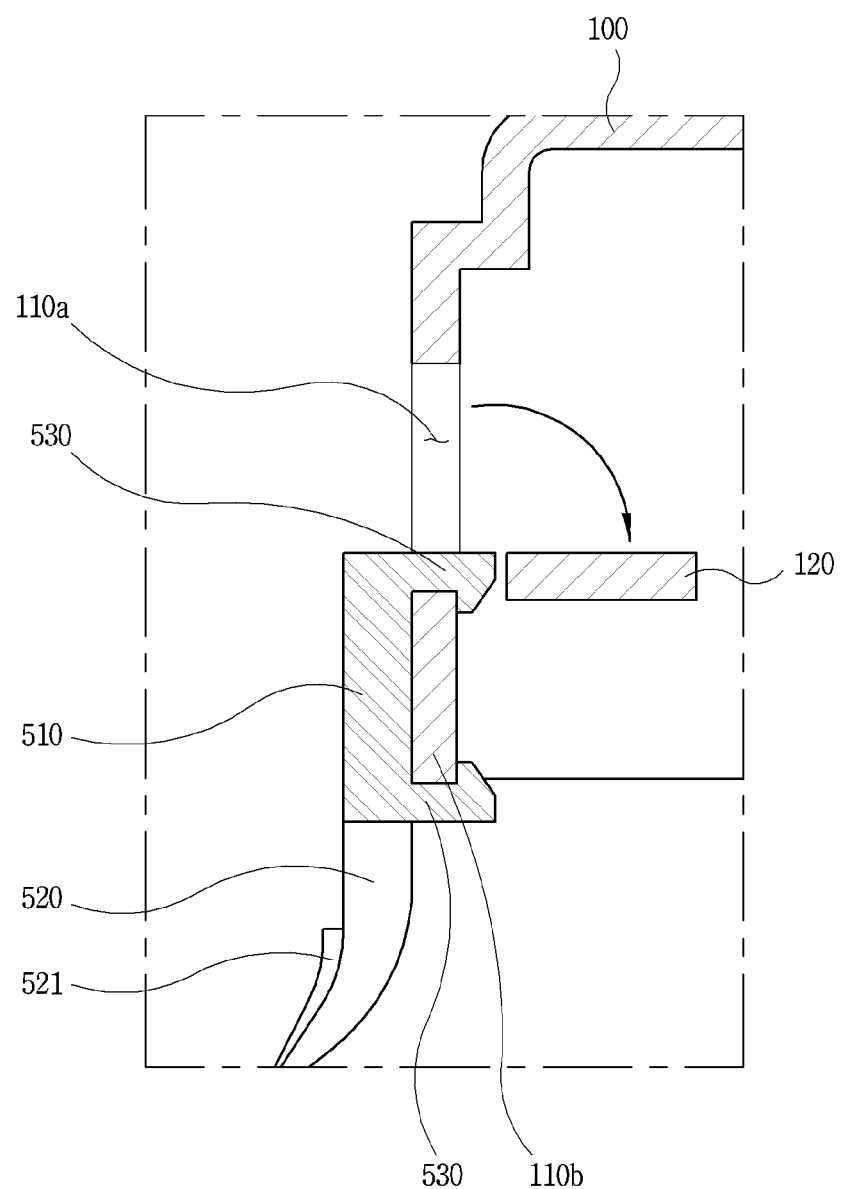
FIG. 15 is a cross-sectional view illustrating a portion where an outer cover and a digging member of FIG. 14 are combined.
Figure 16:
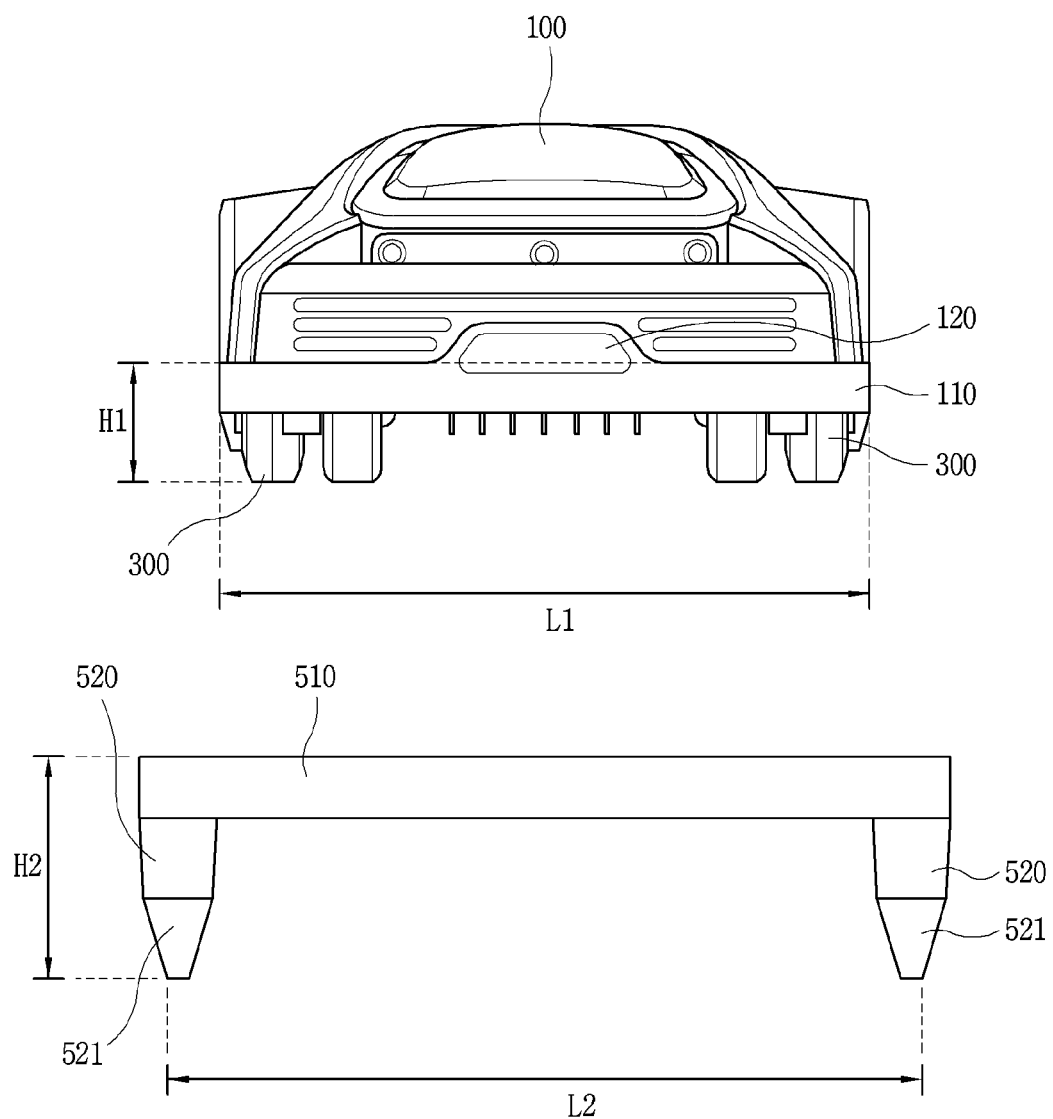
FIG. 16 is a front view illustrating an exploded lawn mower robot of FIG. 14.

5. Description of the Digging Member 500 According to an Embodiment of the Present Disclosure FIG. 14 is an exploded perspective view illustrating a lawn mower robot in accordance with an embodiment of the present disclosure. FIG. 15 is a cross-sectional view illustrating a portion where an outer cover and a digging member of FIG. 14 are combined. FIG. 16 is a front view illustrating an exploded lawn mower robot of FIG. 14.

Referring to FIG. 14, the digging member 500 is coupled to the shock absorbing member 110.

The digging member 500 includes the frame portion 510, the digging portion 520, and the coupling portion 530, and a description of each configuration of the digging member 500 is described above, and will not be repeated.

Referring to FIG. 15, a coupling structure between the digging member 500 and the shock absorbing member 110 is illustrated.

The coupling portion 530 may be a pair of hook-shaped protrusions spaced apart by a predetermined distance in the vertical direction.

A pair of hook-shaped protrusions extends from the frame portion 510 toward the shock absorbing member 110. Here, in the pair of hook-shaped protrusions, the hook-shaped protrusions are spaced apart by a vertical height of a portion of the shock absorbing member 110 located at a lower side of the mounting hole 110*a*.

When an upper side hook-shaped protrusion in the pair of hook-shaped protrusions presses the mounting hole opening and closing member 120, the mounting hole opening and closing member 120 is rotated to be opened.

Then, the upper side hook-shaped protrusion is inserted into the mounting hole 110*a*, and a lower side hook-shaped protrusion in the pair of hook-shaped protrusions is directed to a lower side of the shock absorbing member 110.

Each end portion of the pair of hook-shaped protrusions protrudes toward each other. That is, a distance between each end portion of the pair of hook-shaped protrusions is formed to be shorter than a vertical height of the shock absorbing member coupling portion 110*b*.

Accordingly, when the digging member 500 is coupled, each end portion of the pair of hook-shaped protrusions is caught by the shock absorbing member coupling portion 110*b*.

As a result, the pair of hook-shaped protrusions is fitted into the shock absorbing member 110 with the shock absorbing member coupling portion 110*b* interposed therebetween, and the digging member 500 is prevented from being arbitrarily moving in the back-and-forth direction.

In addition, each end portion of the pair of hook-shaped protrusions is formed to be inclined to slide an upper surface and a lower surface of the shock absorbing member coupling portion 110*b*.

Referring to FIG. 16, a front view of the lawn mower robot with the digging member 500 being separated therefrom is illustrated.

Each end portion of a pair of digging portions 520 presses the ground to form a groove.

In a coupled state, the end portion of the digging portion 520 and an upper surface of the frame portion 510 are spaced apart by a second distance H2 in the vertical direction.

In addition, in the coupled state, the upper surface of the frame portion 510 and a part of the wheel 300 closest to the ground is separated by a first distance H1.

The second distance H2 is longer than the first distance H1. Accordingly, when the lawn mower robot travels, the end portion of the digging portion 520 may dig a groove having a depth equal to a difference between the second distance H2 and the first distance H1 in the ground.

In one embodiment, the difference between the second distance H2 and the first distance H1 may be 2 cm to 3 cm.

A distance L2 between two parts spaced farthest apart from each other among parts of each end portion of the pair of digging portions 520 is greater than a distance L1 between two parts spaced farthest apart from each other among parts of the pair of wheels 300.

Accordingly, grooves dug in the ground by the pair of digging portions 520 are formed at outer sides of the pair of wheels 300, and seeds discharged outside the wheel 300 while the lawn mower robot 10 is traveling can fall into the grooves in the ground.

In one embodiment, an end portion of the digging portion 520 may be located at an outer side of an adjacent wheel 300. In the illustrated embodiment, an end portion of the digging portion 520 on the left may be positioned further left than the wheel 300 on the left. In addition, an end portion of the digging portion 520 on the right may be positioned further right than the wheel 300 on the right. Accordingly, the seeds discharged from each of the wheels 300 can fall into each of the grooves.

In this embodiment, the pair of digging portions 520 may be curved in a forward direction of the lawn mower robot 10.

Then, when the lawn mowing robot 10 moves forward, a lower end portion of the digging portion 520 is moved while being obliquely embedded in the ground. As a result, compared to a case in which the lower end portion of the digging portion 520 is perpendicular to the ground, the groove can be dug more easily.

However, when the lawn mower robot 10 travels on a rough area of a terrain, a traveling path of the lawn mower robot 10 may be twisted due to the digging portion 520.

For example, when a large number of stones or obstacles having a size that are difficult to be dug by the digging portion 520 exists, the traveling path of the lawn mowing robot 10 may be changed by the digging portion 520.

Specifically, since the end portion of the digging portion 520 faces the forward direction of the lawn mower robot 10, when the end portion of the digging portion 520 collides with stones or obstacles, a relatively large amount of impact is applied to the lawn mowing robot 10, and thereby, the path of the lawn mower robot 10 may be distorted.

In consideration of this point, the digging portion 520 may be formed to be curved in a direction opposite to the forward direction of the lawn mower robot 10.

6. Description of a Digging Member 600 According to Another Embodiment of the Present Disclosure FIG. 17 is a partial perspective view illustrating another embodiment of the digging member 500 according to FIG. 14.

Figure 17:
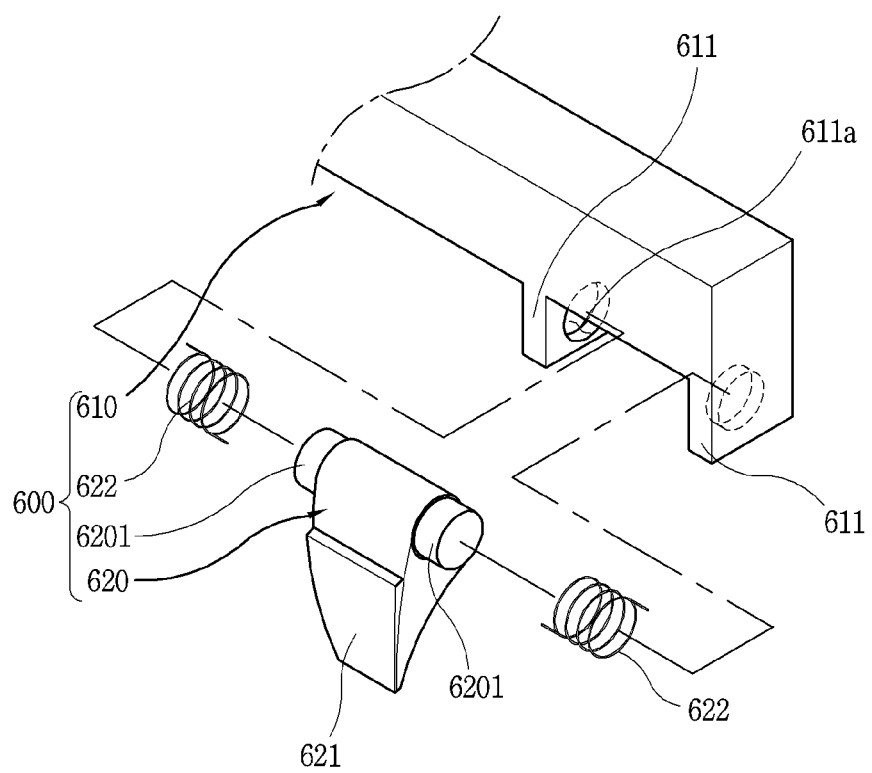
FIG. 17 is a partial perspective view illustrating another embodiment of the digging member according to FIG. 14.

Referring to FIG. 17, a digging portion 620 of the digging member 600 according to this embodiment is curved in a direction opposite to the forward direction of the lawn mowing robot 10.

Since an end portion of the digging portion 620 faces the direction opposite to the forward direction of the lawn mower robot 10, stones or obstacles are brought into contact with a curved surface of the digging portion 620 facing the forward direction rather than being brought into contact with the end portion of the digging portion 620.

As a result, the digging portion 620 can ride over stones or obstacles, so as to restrain the traveling path of the lawn mower robot 10 from being changed by stones or obstacles.

One surface of the digging portion 620 facing the forward direction may be provided with a reinforcing member 621 for reinforcing a portion that can be brought into direct contact with the ground.

The reinforcing member 621 may be made of a material having a strength greater compared to that of the digging portion 620. Since the reinforcing member 621 instead of the digging portion 620 is brought into contact with the ground to dig a groove, an abrasion of the digging portion 620 can be suppressed.

In addition, the digging portion 620 according to this embodiment may be rotatably coupled to the frame portion 610 by a predetermined angle in a direction toward or away from the wheel 300.

In one embodiment, a pair of frame hinges 611 spaced apart by a predetermined distance is provided on each side of the frame portion 610, and each surface of the pair of frame hinges 611 facing each other is provided with a rotation coupling hole 611*a* formed to be recessed.

Rotation coupling protrusions 6201 are formed to protrude from both sides of a portion of the digging portion 620 adjacent to the frame portion 610 toward the pair of frame hinges 611, respectively.

The rotation coupling protrusion 6201 is rotatably inserted into the frame hinge 611. Thereby, the digging portion 620 is rotatably coupled to the frame portion 610.

The rotation coupling protrusion 6201 may be provided with a torsion spring 622 that presses the digging portion 620 in a direction away from the wheel 300 as the digging portion 620 approaches the wheel 300.

Figure 18:
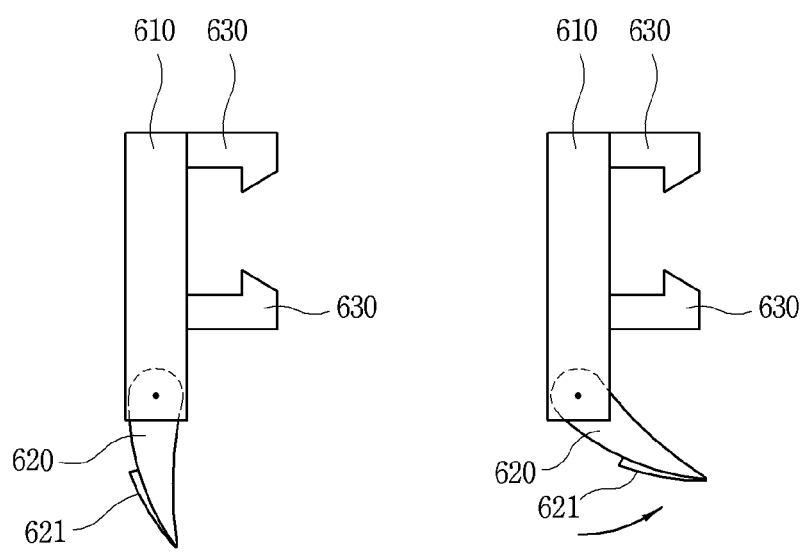
FIG. 18 is a conceptual view illustrating an operation process of the digging member according to FIG. 17.

FIG. 18 is a conceptual view illustrating an operation process of the digging member 600 according to FIG. 17.

Referring to FIG. 18, a state (a) before the digging portion 620 is brought into contact with stones or obstacles and a state (b) in which the digging portion 620 is rotated by being brought into contact with the stones or obstacles are illustrated.

When the digging portion 620 contacts stones or obstacles, the digging portion 620 is pressed by the stones or obstacles in a direction opposite to the forward direction, so that the digging portion 620 is rotated by a predetermined angle toward the direction opposite to the forward direction. Thereby, the digging portion 620 can more easily ride over stones or obstacles.

That is, when the digging portion 620 is brought into contact with stones or obstacles, the digging portion 620 is rotated by a predetermined angle in a direction toward the wheel 300, thereby making it easier for the digging portion 620 to ride over the stones or obstacles.

When the digging portion 620 is rotated by the predetermined angle in the direction toward the wheel 300, the torsion spring 622 presses the digging portion 620 to be rotated in a direction away from the wheel 300. The torsion spring 622 provides a restoring force that is a force to turn the digging portion 620 back to the state before the digging portion 620 is rotated.

Accordingly, after the digging portion 620 rides over the stones or obstacles, the digging portion 620 is rotated in a direction away from the wheel 300 to return to its original state.

The digging portion 620 of the digging member 600 according to this embodiment is provided with a curved surface in a direction opposite to the forward direction, and the curved surface is brought into contact with stones or obstacles when the lawn mower robot 10 travels.

Thereby, the digging member 600 can more easily ride over stones or obstacles.

In addition, when the digging portion 620 of the digging member 600 according to this embodiment is brought into contact with stones or obstacles, the digging portion 620 is rotated in a direction opposite to the forward direction.

Thereby, the digging member 600 can more easily ride over stones or obstacles.

As a result, a change of a traveling path of the lawn mower robot 10 due to a collision between the digging member 600 and stones or obstacles can be suppressed.

Although the foregoing description has been given with reference to the preferred embodiment, it will be understood that those skilled in the art will be able to variously modify and change the present disclosure without departing from the scope of the disclosure described in the claims below.

What is claimed is:

1. A wheel for a lawn mower robot, comprising:
a wheel frame rotated by a power portion; and
a wheel cover detachably coupled to one side of the wheel frame,
wherein the wheel cover comprises:
a seed storage portion protruding from one surface of the wheel cover toward the wheel frame and having a storage space therein;
a seed supply portion extending in a direction away from a circumference of the seed storage portion and having a supply passage formed therein to communicate with the storage space; and
a seed outlet port located at an end portion of the supply passage and formed through in a direction away from the wheel frame,
wherein the supply passage comprises:
an inlet passage communicating with the storage space and extending in a direction away from the seed storage portion;
an outlet passage spaced apart from the inlet passage by a predetermined distance in a circumferential direction of the seed storage portion, and extending in the direction away from the seed storage portion, and communicating with the seed outlet port; and
an intermediate passage connecting the inlet passage and the outlet passage.

2. The wheel of claim 1, wherein the seed supply portion is formed in plural along the circumference of the seed storage portion.

3. The wheel of claim 1, wherein the seed supply portion has an inclined surface located at an end portion of the supply passage and inclined in a direction away from the seed storage portion and in a direction toward the seed outlet port.

4. The wheel of claim 1, wherein the wheel cover has a first through hole formed therethrough to communicate the storage space and an outside of the wheel cover, and
wherein the wheel cover includes a first cover covering the first through hole and detachably coupled to the first through hole.

5. The wheel of claim 4, wherein the first cover has a second through hole formed therethrough to communicate the storage space and the outside of the wheel cover,
wherein the second through hole is located adjacent to a circumference of the first cover, and
wherein the wheel cover includes a second cover covering the second through hole and detachably coupled to the second through hole.

6. A lawn mower robot, comprising:
an inner body provided with a power portion therein;
a pair of wheels provided at both sides of the inner body and rotated by the power portion; and
an outer cover covering the inner body and each side of the pair of wheels,
wherein the wheel comprises:
a wheel frame rotated by the power portion; and
a wheel cover detachably coupled to one side of the wheel frame, wherein the wheel cover comprises:
  a seed storage portion protruding from one surface of the wheel cover toward the wheel frame and having a storage space therein;
  a seed supply portion extending in a direction away from a circumference of the seed storage portion and having a supply passage formed therein to communicate with the storage space; and
  a seed outlet port located at an end portion of the supply passage and formed through in a direction away from the wheel frame,
wherein the lawn mower robot further comprising:
  a digging member coupled to one side of the outer cover,
  wherein the digging member comprises:
    a frame portion extending to both sides of the inner body; and
    a pair of digging portions provided at both sides of the frame portion and extending toward a ground,
    wherein the digging portion is formed to be bent in a direction close to the wheel, and
    wherein one surface of the digging portion facing forward is provided with a reinforcing member coupled thereto,
    wherein the digging portion is rotatably coupled to the frame portion in a direction toward or away from the wheel by a predetermined angle, and is provided with an elastic member configured to press the digging portion in a direction away from the wheel as the digging portion approaches the wheel.

7. The lawn mower robot of claim 6, wherein a distance between two parts spaced farthest apart from each other among parts of each end portion of the pair of digging portions is greater than a distance between two parts spaced farthest apart from each other among parts of the pair of wheels.

8. The lawn mower robot of claim 6, wherein the seed supply portion is formed in plural along the circumference of the seed storage portion.

9. The lawn mower robot of claim 6, wherein the supply passage comprises:
  an inlet passage communicating with the storage space and extending in a direction away from the seed storage portion;
  an outlet passage spaced apart from the inlet passage by a predetermined distance in a circumferential direction of the seed storage portion, extending in the direction away from the seed storage portion, and communicating with the seed outlet port; and
  an intermediate passage connecting the inlet passage and the outlet passage.

10. The lawn mower robot of claim 6, wherein the seed supply portion has an inclined surface located at an end portion of the supply passage and inclined in a direction away from the seed storage portion and in a direction toward the seed outlet port.

11. A wheel for a lawn mower robot, comprising:
  a wheel frame rotated by a power portion; and
  a wheel cover detachably coupled to one side of the wheel frame,
  wherein the wheel frame comprises:
    a seed storage portion protruding from one surface of the wheel frame toward the wheel cover and having a storage space therein;
    a seed supply portion extending in a direction away from a circumference of the seed storage portion and having a supply passage formed therein to communicate with the storage space; and
    a seed outlet portion extending from one end of the seed supply portion toward the wheel cover, and provided with an outlet passage formed therein to communicate with the supply passage and having one end open, and
  wherein the wheel cover has a seed outlet portion insertion hole formed therethrough into which the seed outlet portion is inserted,
  wherein the seed supply portion is formed in plural along the circumference of the seed storage portion,
  wherein the supply passage comprises:
    a first passage communicating with the storage space and extending in a direction away from the seed storage portion;
    a second passage communicating with the first passage and extending while forming a predetermined angle with the first passage; and
    a third passage communicating with the second passage, extending in the direction away from the seed storage portion, and communicating with the second passage.

12. The wheel of claim 11, wherein the seed supply portion has an inclined surface located at a portion where the third passage and the outlet passage are connected, and inclined in a direction away from the seed storage portion and in a direction toward the seed outlet portion insertion hole.

* * * * *